US011812334B2

(12) United States Patent
Henry et al.

(10) Patent No.: US 11,812,334 B2
(45) Date of Patent: *Nov. 7, 2023

(54) DYNAMIC ANCHOR ASSIGNMENTS FOR UWB RANGING

(71) Applicant: Cisco Technology, Inc., San Jose, CA (US)

(72) Inventors: Jerome Henry, Pittsboro, NC (US); Robert Edgar Barton, Richmond (CA); Matthew Aaron Silverman, Shaker Heights, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/885,981

(22) Filed: Aug. 11, 2022

(65) Prior Publication Data

US 2022/0386069 A1    Dec. 1, 2022

Related U.S. Application Data

(63) Continuation of application No. 17/125,144, filed on Dec. 17, 2020, now Pat. No. 11,457,330.
(Continued)

(51) Int. Cl.
*H04W 4/02* (2018.01)
*H04B 1/7163* (2011.01)
*H04W 74/08* (2009.01)

(52) U.S. Cl.
CPC .......... *H04W 4/023* (2013.01); *H04B 1/7163* (2013.01); *H04W 74/0825* (2013.01)

(58) Field of Classification Search
CPC . H04W 4/023; H04W 74/0825; H04B 1/7163
(Continued)

(56) References Cited

U.S. PATENT DOCUMENTS 6,941,110 B2    9/2005 Kloper et al.
8,144,685 B2    3/2012 Sakoda
(Continued)

FOREIGN PATENT DOCUMENTS

CN    109348409 A    2/2019
CN    105430767 B    4/2019
(Continued)

OTHER PUBLICATIONS

Michael Stocker, BSc, "Design of a Decentralized and Synchronous UWB-based Localization System", Graz University of Technology (TU Graz), May 2018, 111 pages.
(Continued)

*Primary Examiner* — Ted M Wang
(74) *Attorney, Agent, or Firm* — Edell, Shapiro & Finnan, LLC

(57) ABSTRACT

Presented herein are techniques for assigning Ultra-Wideband (UWB) anchors for client ranging. A control device can monitor UWB ranging between a mobile device and a primary anchor. In response to determining that a signal strength between the mobile device and the primary anchor is below a threshold, the control device can identify anchors for which the mobile device has had a signal strength above the threshold during a period of time, and select one of the anchors as a new primary anchor for the mobile device. For example, the control device can select the new primary anchor based on a relative collision tolerance mapping for the new primary anchor and at least one other anchor within a UWB range of the new primary anchor. The control device can send a command causing UWB ranging to be performed between the mobile device and the new primary anchor.

20 Claims, 17 Drawing Sheets

Related U.S. Application Data

(60) Provisional application No. 63/069,887, filed on Aug. 25, 2020.

(58) Field of Classification Search
USPC .......................................................... 375/141
See application file for complete search history.

(56) References Cited

U.S. PATENT DOCUMENTS

| | | |
|---|---|---|
| 8,515,411 B2 | 8/2013 | Sarkar et al. |
| 8,559,887 B2 | 10/2013 | Stager et al. |
| 8,776,221 B2 | 7/2014 | Rangarajan et al. |
| 9,763,216 B2 | 9/2017 | Sayeed |
| 9,823,330 B2 | 11/2017 | Hart et al. |
| 9,949,083 B1 | 4/2018 | Kirby et al. |
| 9,998,856 B2 | 6/2018 | Edge |
| 10,064,012 B1 | 8/2018 | Boston et al. |
| 11,082,809 B1 | 8/2021 | Burowski et al. |
| 11,199,406 B2 | 12/2021 | Dormody et al. |
| 11,246,010 B2 | 2/2022 | Mao et al. |
| 11,271,943 B2 | 3/2022 | Urabe et al. |
| 2005/0085190 A1 | 4/2005 | Nishikawa |
| 2005/0135811 A1* | 6/2005 | Lee .................... H04B 10/1125 398/139 |
| 2005/0228613 A1 | 10/2005 | Fullerton et al. |
| 2008/0101296 A1 | 5/2008 | Palin et al. |
| 2008/0186231 A1 | 8/2008 | Mjadeff et al. |
| 2009/0311960 A1 | 12/2009 | Farahani et al. |
| 2010/0271263 A1 | 10/2010 | Moslifeghi |
| 2013/0138314 A1 | 5/2013 | Viittala et al. |
| 2014/0152437 A1 | 6/2014 | Tian et al. |
| 2015/0156637 A1 | 6/2015 | Li et al. |
| 2015/0289099 A1 | 10/2015 | Marano et al. |
| 2015/0378002 A1 | 12/2015 | Hughes et al. |
| 2016/0178727 A1 | 6/2016 | Bottazzi |
| 2016/0212579 A1 | 7/2016 | Duan et al. |
| 2017/0003374 A1 | 1/2017 | Hehn et al. |
| 2017/0082727 A1 | 3/2017 | Sendonaris et al. |
| 2017/0123039 A1 | 5/2017 | Shin et al. |
| 2017/0123045 A1 | 5/2017 | Shin et al. |
| 2017/0280281 A1* | 9/2017 | Pandey ................. G01S 5/0268 |
| 2017/0356979 A1 | 12/2017 | Georgiou et al. |
| 2018/0059231 A1 | 3/2018 | Dewberry et al. |
| 2018/0310272 A1 | 10/2018 | Younis |
| 2019/0033423 A1 | 1/2019 | Moslifeghi |
| 2019/0110227 A1 | 4/2019 | Lepp et al. |
| 2019/0135229 A1 | 5/2019 | Ledvina et al. |
| 2019/0166574 A1 | 5/2019 | Abou-Rizk et al. |
| 2019/0187241 A1 | 6/2019 | Jaeger |
| 2019/0195981 A1 | 6/2019 | Ding et al. |
| 2019/0252064 A1 | 8/2019 | Pipher et al. |
| 2019/0337155 A1* | 11/2019 | Kwak .................. B25J 11/0085 |
| 2019/0349709 A1 | 11/2019 | Kim et al. |
| 2019/0387374 A1 | 12/2019 | Gherardi et al. |
| 2020/0014526 A1 | 1/2020 | Hammerschmidt et al. |
| 2020/0037113 A1 | 1/2020 | Tyagi et al. |
| 2020/0041601 A1 | 2/2020 | Ko et al. |
| 2020/0137676 A1 | 4/2020 | Yoon et al. |
| 2020/0178036 A1 | 6/2020 | Edge |
| 2020/0209341 A1 | 7/2020 | Ylamurto et al. |
| 2020/0228943 A1 | 7/2020 | Martin et al. |
| 2020/0314681 A1 | 10/2020 | Kuo et al. |
| 2021/0136556 A1 | 5/2021 | Lee et al. |
| 2021/0352434 A1 | 11/2021 | Harvey et al. |
| 2021/0373142 A1 | 12/2021 | Lim |
| 2021/0400441 A1 | 12/2021 | Burowski et al. |
| 2022/0011398 A1 | 1/2022 | Duan et al. |

FOREIGN PATENT DOCUMENTS

| | | |
|---|---|---|
| CN | 110730422 A | 1/2020 |
| CN | 210042235 U | 2/2020 |
| WO | 2015078327 A1 | 6/2015 |
| WO | 2017091792 A1 | 6/2017 |
| WO | 2019067105 A1 | 4/2019 |
| WO | 2022025693 A1 | 2/2022 |

OTHER PUBLICATIONS

Sang, Cung Lian et al., "Numerical and Experimental Evaluation of Error Estimation for Two-Way Ranging Methods", www.mdpi.com/journal/sensors, Feb. 1, 2019, 28 pages.

Harnesswalla, Taha, "IEEE 802.15.4a—Understanding the protocol and Reducing Multi-User Interference.", Apr. 9, 2013, 80 pages.

El-Kamchouchi, Hassan Mohamed et al., "Towards a Precise Direction of Arrival Estimation for Coherent Sources Using ECMUSIC", Journal of Electrical and Electronic Engineering vol. 4, Issue 2, http://article.sciencepublishinggroup.com/html/10.11648.j.jeee.20160402.17.html, Apr. 2016, 9 pages.

Xiaojie Zhao et al., "Does BTLE measure up against WiFi? A comparison of indoor location performance", VDE VERLAG GMBH, Berlin, Offenbach, Germany, ISBN 978-3-8007-3621-8, European Wireless, Jan. 2014, 6 pages.

Qiang Xu et al., "Device Fingerprinting in Wireless Networks: Challenges and Opportunities", IEEE Communications Surveys & Tutorials, vol. 18, No. 1, Draft dated Jan. 8, 2015, 22 pages.

"IEEE Standard for Low-Rate Wireless Networks—Amendment 1: Enhanced Ultra Wideband (UWB) Physical Layers (PHYs) and Associated Ranging Techniques," IEEE Standards Association, IEEE Std 802.15.4z™—2020, Aug. 25, 2020, 174 pages.

"IEEE Standard for Information technology—Telecommunications and information exchange between systems—Local and metropolitan area networks—Specific requirements—Part 15.4: Wireless Medium Access Control (MAC) and Physical Layer (PHY) Specifications for Low-Rate Wireless Personal Area Networks (WPANs)—Amendment 1: Add Alternate PHYs," IEEE, IEEE Std 802.15.4a™—2007, Aug. 31, 2007, 203 pages.

Paul Cheong, et al., "An Energy-Efficient Positioning-Enabled MAC Protocol (PMAC) for UWB Sensor Networks," Proceedings of IST mobile and wireless communications summit, 2005, 6 pages.

"802.15.4-2020—IEEE Standard for Low-Rate Wireless Networks," IEEE Xplore, Jul. 23, 2020, 3 pages; https://ieeexploreieee.org/document/9144691.

"802.15.6-2012—Part 15.6: Wireless Body Area Networks," IEEE Standard for Local and metropolitan area networks, IEEE Computer Society, Feb. 29, 2012, 271 pages.

\* cited by examiner

DYNAMIC ANCHOR ASSIGNMENTS FOR UWB RANGING

CROSS REFERENCE TO RELATED APPLICATION

This application is a continuation of and claims the benefit of priority to U.S. patent application Ser. No. 17/125,144, filed Dec. 17, 2020, and issued as U.S. Pat. No. 11,457,330 on Sep. 27, 2022, which application claims priority to U.S. Provisional Patent Application No. 63/069,887, entitled "Dynamic Anchor Group Reconfiguration for Secure UWB Ranging," filed Aug. 25, 2020, the entirety of which applications are incorporated herein by reference.

TECHNICAL FIELD

The present disclosure relates to network equipment and services.

BACKGROUND

Networking architectures have grown increasingly complex in communications environments, particularly mobile networking environments. In some instances, it is useful to determine a mobile device location within a mobile networking environment. While Institute of Electrical and Electronics Engineers (IEEE) 802.11 (e.g., Wi-Fi®) or Bluetooth® ranging techniques may be utilized in some cases to determine mobile device location, such technologies typically provide limited location accuracy.

Ultra-Wideband (UWB), as defined in IEEE 802.15.4a and 802.15.4z, may offer improved ranging accuracy over Bluetooth and Wi-Fi. However, UWB ranging techniques are not designed for scale. For example, UWB ranging procedures generally require all UWB anchors and clients to be on the same channel, which can cause channel saturation and/or signal collisions.

DESCRIPTION OF EXAMPLE EMBODIMENTS

Overview

Figure 1:
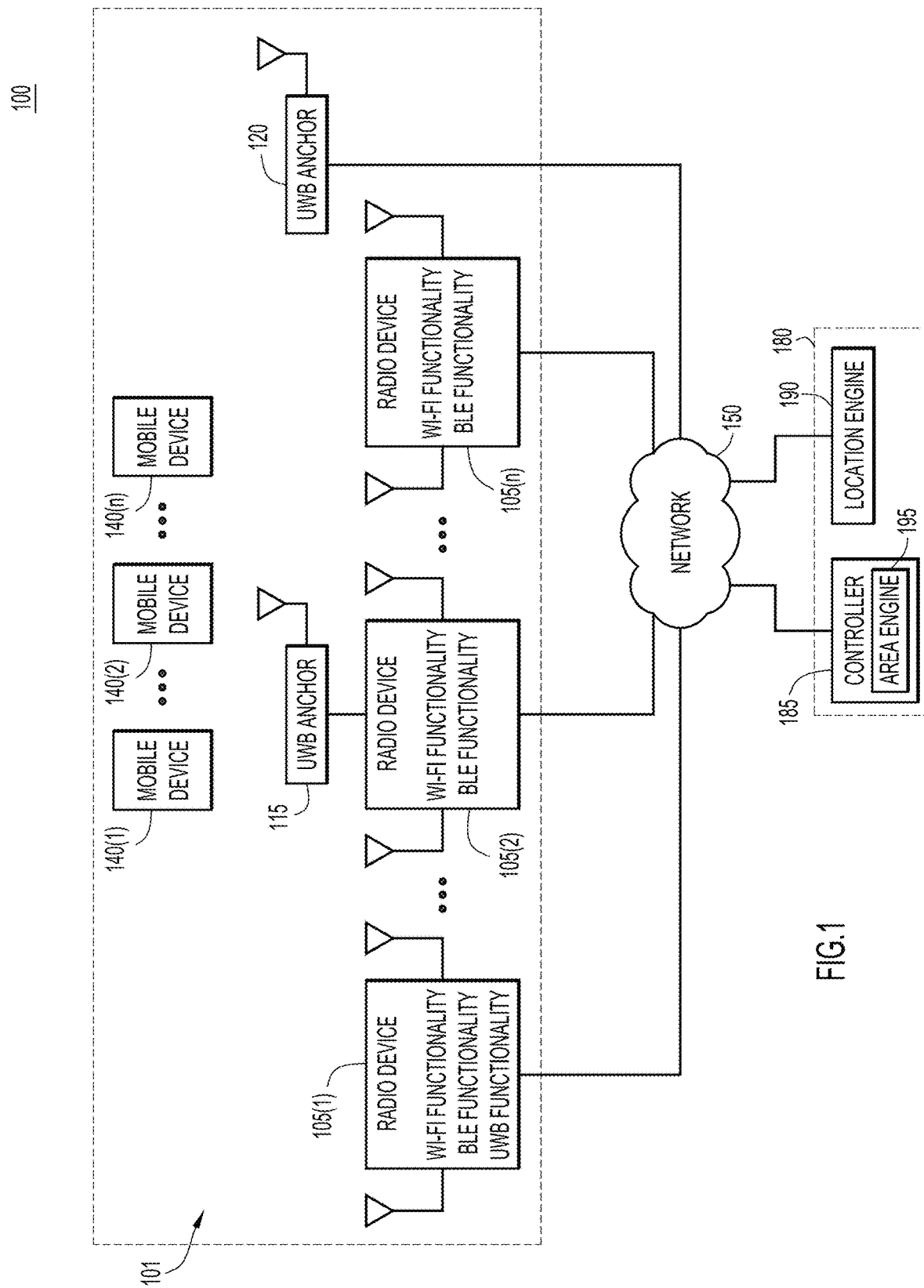
FIG. 1 is a diagram of a system in which techniques for dynamic anchor assignments for UWB ranging may be implemented, according to an example embodiment.

In one embodiment, a control device can be configured to monitor ultra-wide band (UWB) ranging between a mobile device and a primary UWB anchor. The control device can determine that a signal strength between the mobile device and the primary UWB anchor is below a predetermined threshold. In response to this determination, the control device can identify a plurality of UWB anchors for which the mobile device has had a signal strength above the predetermined threshold during a predetermined period of time, and select one of the plurality of UWB anchors as a new primary UWB anchor for the mobile device. For example, the control device can select the new primary UWB anchor based on a relative collision tolerance mapping for the new primary UWB anchor and at least one other UWB anchor within a UWB range of the new primary UWB anchor. The control device can send a command that causes a UWB ranging procedure to be performed between the mobile device and the new primary UWB anchor.

EXAMPLE EMBODIMENTS

Presented herein are techniques for assigning UWB anchors for UWB client ranging. Client ranging can be used, e.g., for detecting and/or tracking a location of a mobile device. Client ranging using a UWB localization technique, i.e., a localization technique involving UWB transmissions, is referred to herein as "UWB ranging." For example, UWB ranging can include time-of-flight (ToF), time-of-arrival (ToA), time-difference-of-arrival (TDoA), received signal strength indicator (RSSI), or other analyses of UWB transmissions. UWB ranging is relatively precise, providing ranging accuracy within about 10 centimeters in line-ofsight (LoS) situations. This level of accuracy is useful for both client-driven and infrastructure-based applications where, for example, Bluetooth Low Energy (BLE) or Wi-Fi-based ranging may provide disappointing results.

However, UWB ranging protocols are not designed for scale. For example, in IEEE 802.15.4a and IEEE 802.15.4z, UWB ranging is specified for one mobile device ranging against only one or a few UWB anchors. Yet, in certain environments, there may be many available UWB anchors, especially when the UWB anchors are installed near access points at ceiling level and in radio frequency (RF) range of one another.

Moreover, UWB protocols generally require all UWB anchors and mobile devices to be on the same channel. Determining which UWB anchor is associated to which mobile device can be important to avoid channel saturation. This is true both for UWB anchors (which may detect transmissions from many mobile devices but may suffer from collisions with mobile devices ranging against neighboring UWB anchors) and for mobile devices (which may encounter channel saturation and be prevented from engaging in the ranging exchanges they need for accurate location).

In an example embodiment, a space can include a plurality of UWB anchor devices. A control device associated with the space can be configured to identify an optimal set of UWB anchors against which a mobile device should range. For example, the control device can be configured to assign an initial set of UWB anchors for client ranging when a mobile device first enters the space, and the control device can be further configured to dynamically change the UWB anchor assignment as appropriate if, and as, the mobile device moves within the space.

The control device can designate one of the UWB anchor devices as a primary UWB anchor and other of the UWB anchor devices as secondary UWB anchors. The primary UWB anchor can communicate with the mobile device to complete a location exchange, while the secondary UWB anchors (which are in RF proximity to the primary UWB anchor) can operate as "receive-only anchors," which passively receive UWB transmissions from the mobile device and from the primary UWB anchor but do not send communications to the mobile device. The secondary UWB anchors can, e.g., report the UWB transmissions, and/or information based on the UWB transmissions, to the control device for processing. For example, each of the secondary UWB anchors can report to a controller of the control device each frame it detects, and to a location engine of the control device, each frame that allows computation of a range/location.

In an example embodiment, the control device is configured to monitor UWB ranging between the mobile device and the primary UWB anchor. For example, the control device can monitor a signal strength between the mobile device and the primary UWB anchor. If the control device determines that the signal strength between the mobile device and the primary UWB anchor is below a predetermined threshold (sometimes called a "handover threshold"), the control device can initiate a procedure to dynamically reassign the primary UWB anchor for the mobile device. In particular, the control device can identify a plurality of UWB anchors for which the mobile device has had a signal strength above the handover threshold during a predetermined period of time, and select one of the plurality of UWB anchors as a new primary UWB anchor for the mobile device.

In an example embodiment, the control device can select the new primary UWB anchor based on a relative collision tolerance mapping. For example, the control device can compute the relative collision tolerance mapping using at least one temporal probability collision map and at least one geometric collision map. Each temporal probability collision map can indicate, for a particular UWB anchor, a collision probability if a mobile device count of mobile devices ranging against the particular UWB anchor increases. For example, the collision probability can be determined based on historical data, including a collision count and mobile device count during a particular time interval. Each geometric collision map can identify, for a particular UWB anchor, other UWB anchors that have each detected at least one mobile device-to-anchor exchange involving the particular UWB anchor. Thus, the geometric collision map can indicate what ranging against any possible UWB anchor might mean in terms of detections by/from other UWB anchors.

The control device can use a cross-correlation of one or more of the temporal probability collision map(s) and one or more of the geometric collision map(s), along with signal levels (and/or other information) when collisions have occurred, to compute the relative collision tolerance mapping. For example, the relative collision tolerance mapping can include, for each particular one of the plurality of UWB anchors, a probability that a mobile device ranging against another of the UWB anchors would cause a destructive collision with the particular one of the plurality of UWB anchors. A "destructive collision" is a collision that causes a UWB anchor not to receive a signal intended for the UWB anchor at a level sufficient for the UWB anchor to interpret the signal. A collision may be considered "non-destructive," for example, if a UWB anchor receives a signal, which reflects the occurrence of the collision but nevertheless is at a level sufficient for the UWB anchor to interpret the signal.

For example, the relative collision tolerance mapping can be established pairwise between UWB anchors, with space between the UWB anchors being divided in a grid or other structure. As mobile devices traverse the space (and correspondingly, the grid), their positions can be recorded, along with information regarding whether they successfully or unsuccessfully range with one or more different UWB anchors. For example, a likelihood of a client location for a mobile device involved in a signal collision at a time n can be determined from n−1/n+1 ranges for the mobile device. As there are multiple mobile devices likely to be moving between any two anchor pairs, this logic can be extended to build a grid (or other structure) with a count of mobile devices in each cell/square of the grid, and the collision likelihood based on how many collisions happened with these various mobile device counts and positions. Signal level can be extrapolated from mobile device position. As more mobile devices are added, their likelihood to collide can increase naturally. Historical information regarding successful and unsuccessful ranging operations can be used to determine destructive collision probabilities. For example, if a mobile device at position 3 and another mobile device at position 57 ranged at the same time in the past, and did it successfully, then there may be a relatively low probability that a future signal collision involving these (or similarly configured) mobile devices at these locations would be destructive.

The control device can select the new primary UWB anchor, e.g., based on respective tolerance and mobile device signal levels, informed by the relative collision tolerance mapping. For example, the control device can maximize {tolerance, mobile device signal} and select a primary UWB anchor with a highest relative tolerance and mobile device signal. The tolerance value can be determined, e.g., using historical information, which may be reflected in the relative collision tolerance mapping, such as one or more measurements regarding which anchors received mobile device signals from each of various different grid positions, when a mobile device in a substantially equivalent location was trying to range. For example, the tolerance can be a combination between a mobile device coarse location (e.g., position in the grid), mobile device signal power, and the individual anchor considered. Thus, for each position and power level of a particular mobile device, each anchor can have a tolerance value (e.g., a value from 1 to 100, though any range of numbers or other values could be used) that describes how likely it is that an exchange with the anchor will collide with another mobile device's exchange with another anchor (a high collision likelihood generally corresponding to a low tolerance). As described in more detail below, the tolerance value may reflect a relative destructivity, e.g., by including a weight or other factor, so that the tolerance value indicates a likelihood of destructive collisions as opposed to collisions generally.

Accordingly, the control device may select a primary UWB anchor for which (a) effective ranging triangulation will be available (because the transmissions between the anchor and the mobile device will be detected by other, secondary anchors around the mobile device), and (b) ranging against the anchor will cause a minimal amount of (disruptive) interference with other mobile devices ranging against other anchors. The control device can send a command that causes a UWB ranging procedure to be performed between the mobile device and the new primary UWB anchor.

Turning now to FIG. 1, an example system 100 for assigning UWB anchors for client ranging within a space 101 can include a plurality of radio devices 105 configured to wirelessly communicate with a plurality of mobile devices 140 via one or more of a variety of different communication technologies. For example, each of the radio devices 105 can be configured to communicate using any radio access technology, such as Wi-Fi, Bluetooth, Bluetooth Low Energy (BLE), IEEE 802.15.4 (low-rate wireless personal area networks (LR-WPANs)), etc. Each of the radio devices 105 may or may not include UWB functionality.

In an example embodiment, each of the radio devices 105 includes an access point or other radio or network device configured to facilitate a communication involving one or more mobile devices (such as mobile devices 140). For example, the radio devices 105 can include one or more access points configured to facilitate communication between one or more of the mobile devices 140 and a network 150. Access points are sometimes referred to herein as "APs" or "WLAN access points."

Each of the radio devices 105 can communicate with (i.e., send transmissions to, and/or receive transmission from) one or more of the mobile devices 140 using a relatively short-range wireless local area communication technology, such as (but not limited to) Wi-Fi WLAN, BLE, and/or UWB. For example, radio device 105(1) includes built-in/integrated Wi-Fi functionality for communicating with one or more of the mobile devices 140 over Wi-Fi WLAN, BLE functionality for communicating with one or more of the mobile devices 140 over BLE, and UWB functionality for communicating with one or more of the mobile devices 140 over UWB. Radio device 105(2) includes built-in/integrated Wi-Fi functionality and BLE functionality but not UWB functionality. However, radio device 105(2) is configured to achieve UWB functionality via a separate, peripheral UWB anchor device 115 connected to radio device 105(2). For example, the UWB anchor device 115 can be embodied in a peripheral device connected to radio device 105(2) via a universal serial bus (USB) dongle, a time-synchronized network (TSN) connection, or another connection technology now known or hereinafter developed. Radio device 105(n) also does not include built-in/integrated UWB functionality, and is not connected to any peripheral UWB anchor device. Therefore, radio device 105(n) is not configured to achieve UWB functionality.

Each of the mobile devices 140 can include any mobile device or other object capable of over-the-air RF communications utilizing wireless local area communication technologies such as (but not limited to) Wi-Fi WLAN, BLE, and UWB. Each of the mobile devices 140 also may be capable of over-the-air RF communications utilizing one or more wireless wide area communication technologies such as Third Generation Partnership Project (3GPP) communication technologies (e.g., Fourth Generation (4G)/Long Term Evolution (LTE), Fifth Generation (5G), etc.). For example, each of the mobile devices 140 can include a mobile wireless phone, computer, tablet, smart glasses, Augmented Reality tool, an electronic tag (which may, e.g., be coupled to, or associated with, an electronic or non-electronic object), or another device or object now known or hereinafter developed. A mobile device is sometimes referred to herein as a "client," "station," or "STA."

Each of the mobile devices 140 is configured to communicate with one or more of the radio devices 105. For example, each of the mobile devices 140 may include Wi-Fi WLAN functionality for communicating with one or more of the radio devices 105 over Wi-Fi WLAN, BLE functionality for communicating with one or more of the radio devices 105 over BLE, and/or UWB functionality for communicating with one or more of the radio devices 105 over UWB (either directly or via a peripheral UWB anchor device 115).

The mobile devices 140 also may be configured to communicate over UWB with one or more standalone UWB anchor devices 120. A standalone UWB anchor device 120 includes functionality for receiving (and potentially also sending and/or processing) UWB transmissions without being connected to, or integrated with, a radio device 105. Each standalone UWB anchor device 120 also may include other communication capabilities, such as BLE wireless communication capabilities and/or wired communication capabilities, e.g., via a connection to a network (such as network 150) over IEEE 802.11, Ethernet, or another connection mechanism now known or hereinafter developed.

The terms "UWB anchor" and "anchor" are used interchangeably herein to refer to any device or object configured to detect UWB transmissions from one or more mobile devices (e.g., one or more of the mobile devices 140). For example, a UWB anchor can include a standalone UWB anchor device 120, a peripheral UWB anchor device 115 connected to a radio device 105(2), and/or a radio device 105(1) with UWB functionality. As would be appreciated by a person of ordinary skill in the art, while a UWB anchor can include a radio device 105, not all UWB anchors include radio devices 105, and not all radio devices 105 constitute UWB anchors.

It should be appreciated that the number, type, and arrangement of the radio devices 105, mobile devices 140, peripheral anchor devices 115, standalone UWB anchor devices 120, and UWB anchors, and their respective connectivity configurations and capabilities, are illustrative and can vary in alternative example embodiments.

The radio devices 105, peripheral UWB anchor device 115, standalone UWB anchor device 120, and mobile devices 140 are configured to communicate with a control device 180 via a network 150. The network 150 includes any communications medium for transmitting information between two or more computing devices. For example, the network 150 can include a local area network (LAN), wide area network (WAN), virtual private network (VPN), Intranet, Internet, hardwire connections, modem connections, wireless connections, or combinations of one or more these items.

The control device 180 includes one or more computing devices, which include a controller 185 and a location engine 190. The controller 185 includes hardware and/or software that is configured to manage operation of the radio devices 105. For example, the controller 185 may be a WLAN controller (WLC) configured to facilitate certain communications involving one or more of the mobile devices 140 through one or more of the radio devices 105. The controller 185 further includes an AREA engine 195 configured to cooperate with the location engine 190 to enable UWB ranging for the mobile devices 140. In one form, the controller 185 and the location engine 190 may be separate and physically distinct entities. Alternatively, at least certain of the features and/or functionality of the controller 185 and location engine 190 may be integrated into a single entity, certain of the features and/or functionality described herein in connection with the controller 185 may be included in, and/or performed by, the location engine 190, and/or certain of the features and/or functionality described herein in connection with the location engine 190 may be included in, and/or performed by, the controller 185.

The location engine 190 includes hardware and/or software that is configured to manage location-related transmissions involving the radio devices 105, peripheral UWB anchor device 115, standalone UWB anchor device 120, and/or mobile devices 140. For example, the location engine 190 can be configured to cooperate with the controller 185, radio devices 105, peripheral UWB anchor device 115, standalone UWB anchor device 120, and/or mobile devices 140 to initiate and complete client ranging procedures within the space 101, e.g., by assigning and/or instructing one or more of the radio devices 105, peripheral UWB anchor device 115, and/or standalone UWB anchor device 120 to complete client ranging procedures with respect to one or more of the mobile devices 140. For example, the location engine 190 can be configured so that, when a mobile device 140 enters the space 101, the location engine 190 assigns one of the radio devices 105, peripheral UWB anchor device 115, or standalone UWB anchor device 120 as a primary anchor for engaging in a location exchange with the mobile device 140 and other(s) of the radio devices 105, peripheral UWB anchor device 115, and/or standalone UWB anchor device 120 as secondary anchors for passively receiving transmissions from the mobile device 140 and transmissions from the primary UWB anchor for location processing. The location engine 190 can be further configured to cooperate with the controller 185, radio devices 105, peripheral UWB anchor device 115, standalone UWB anchor device 120, and/or mobile devices 140 to dynamically change the UWB anchor assignment as appropriate if, and as, the mobile devices 140 move within the space 101.

The space 101 can include any indoor or outdoor area, such as a home, school, campus, office building, conference center, stadium, or other venue or location or portion thereof. The space 101 may support any density of mobile devices 140. The location engine 190 can be configured to assign anchors so that accurate client ranging is enabled for each of the mobile devices 140 regardless of density. For example, as set forth in more detail below, for a particular mobile device 140, the location engine 190 can select an optimal set of anchors for client ranging from all available radio devices 105, peripheral UWB anchor devices 115, and/or standalone UWB anchor devices 120 in the space 101.

The location engine 190 can be configured to coordinate client ranging procedures involving any of a variety of different localization techniques. In an example embodiment, the location engine 190 can be configured to coordinate client ranging procedures involving one or more UWB localization techniques, such as ToF, ToA, TDoA, RSSI, or another technique involving analysis of UWB transmissions, and/or one or more non-UWB localization techniques, such as lateration, AoA, or another technique that does not involve UWB transmissions. For example, the location engine 190 can establish an initial set of anchor assignments for a mobile device 140 by estimating a coarse location for the mobile device 140 using a non-UWB localization technique and selecting an optimal set of UWB anchor points for UWB ranging based on the coarse location, and can then use the selected UWB anchor points to determine more precise location information for the mobile device 140 using one or more UWB localization techniques. The location engine 190 also can cooperate with the controller 185 to change anchor assignments as appropriate if and as the mobile device 140 moves through the space 101, e.g., using a relative collision tolerance mapping for UWB anchors in the space 101. Thus, the location engine 190 may limit UWB ranging to selected UWB anchor points, potentially reducing a likelihood of channel saturation and/or signal collisions relative to a configuration in which UWB ranging involves all available or nearby UWB anchor points.

The location engine 190 can include logic for performing one or more location computations based on the localization techniques. For example, the location engine 190 can process time, distance, angle, signal strength, and/or other information from one or more of the radio devices 105, peripheral UWB anchor devices 115, standalone UWB anchor devices 120, and/or mobile devices 140 to determine and/or track a location of a particular one of the mobile devices 140. The location engine 190 can be configured to return results of that processing to the particular one of the mobile devices 140, e.g., through one or more of the radio devices 105, or to some other entity seeking that location information, if so desired. In addition, or in the alternative, the radio devices 105, peripheral anchor devices 115, standalone UWB anchor devices 120, and/or mobile devices 140 can be configured to perform certain location computations and, potentially, to report results from those computations to the location engine 190.

In an example embodiment, the control device 180 is further configured, e.g., at the controller 185 and/or location engine 190, to use signal strength information to monitor primary UWB anchor performance and, potentially, to trigger anchor reassignment if and when a signal strength falls below a handover threshold. For example, if a signal strength between a mobile device 140 and its assigned primary UWB anchor falls below the handover threshold, the location engine 190 and/or controller 185 can cooperate to identify one or more other UWB anchors for which the mobile device 140 has had a signal strength above the handover threshold during a predetermined period of time, and select one of the plurality of UWB anchors as a new primary UWB anchor for the mobile device 140.

The control device 180 also may be further configured, e.g., at the controller 185 and/or location engine 190, to manage, not only which devices are to range with one another, but also a speed/frequency at which they are to range and/or a budget allowed for the ranging. As may be appreciated by a person of ordinary skill in the art, there is a counter-intuitive relationship between modulation complexity and distance when using UWB. When a simple modulation with frequent pulse repetition and long preamble and burst durations is used, the transmission may have a greater range than if a more complex scheme (where, e.g., the receiver has a shorter preamble training time and less frequent pulse repetitions) is used. However, frames with robust modulation schemes take longer to transmit and, thus, consume more power per unit of time (e.g., per second). As UWB is typically regulated around a maximum amount of energy transmitted per unit of time, a choice of a stronger modulation may cause a system to either reduce the number of frames per second or reduce the energy of frames transmitted. An alternative is to increase the modulation complexity, thereby reducing the frame duration and allowing an increased transmit power. Therefore, the signal may be received by farther-away anchors and, at the same time, because the signal is received by farther-away anchors, the density of the devices transmitting at the same time is increased because each of their signals is shorter in time duration.

The control device 180 can be configured to balance these considerations when making anchor assignments and providing UWB ranging instructions. In particular, the control device 180 (e.g., at the controller 185 and/or location engine 190) can be configured to evaluate a collision risk for a mobile device (such as the mobile device 140), both with respect to other nearby devices and with respect to other devices located farther away. For example, if a mobile device is instructed to transmit a stronger signal (because it is in a location where there are not many UWB anchors, for example), then the signal will reach farther and, therefore, be more likely to collide with signals involving other mobile devices. On the other hand, if the modulation used by the mobile device is more complex, its signal may not be demodulated by another distant ranging device, and the signal may, therefore, simply act as a non-disruptive noise floor increase. Such collisions may be less likely to be disrupting other mobile devices in a certain area of the space 101, for example.

Though illustrated in FIG. 1 as discrete components, and as explained above, it should be appreciated that the controller 185 and location engine 190 may be integrated or otherwise reconfigured in any number of different components without departing from the spirit and scope of the embodiments presented herein.

Figure 2:
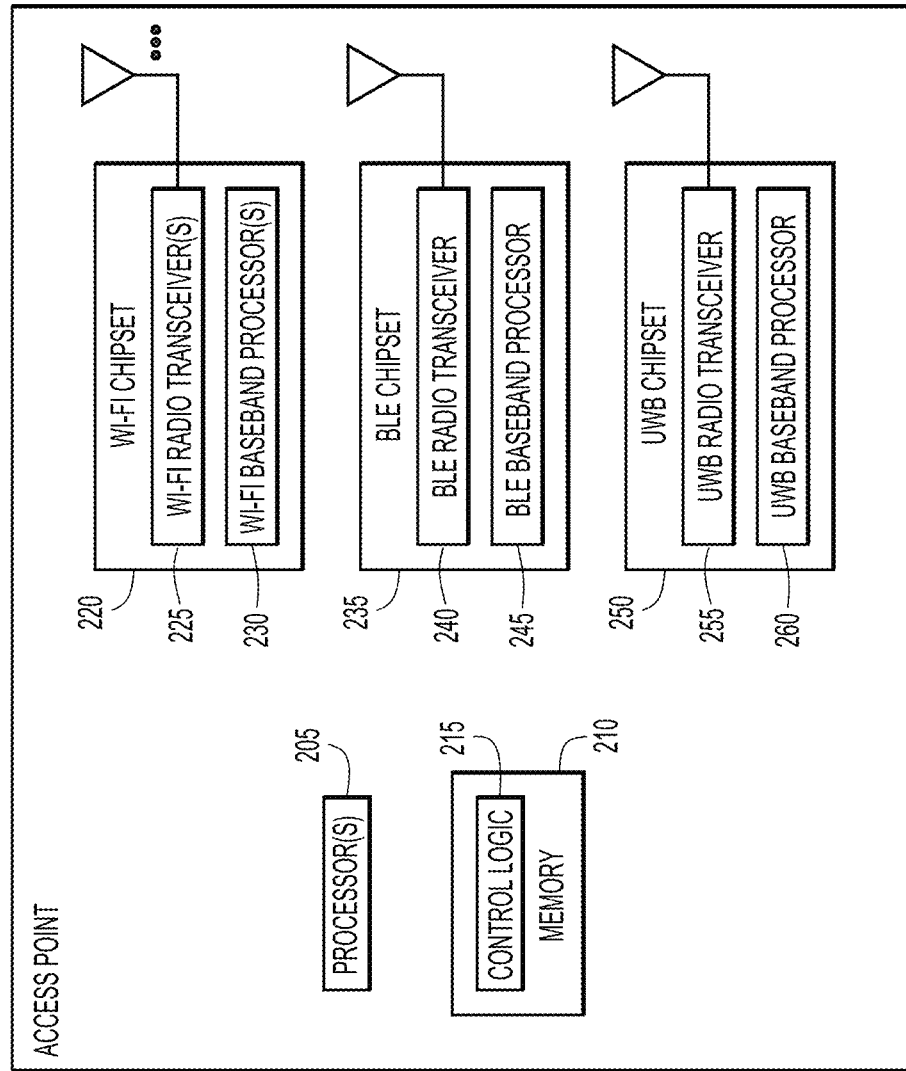
FIG. 2 is a block diagram of an access point configured to participate in the techniques presented herein, according to an example embodiment.

FIG. 2 is a block diagram of an access point 200, according to an example embodiment. The access point 200 includes a Wi-Fi chipset 220 for providing Wi-Fi functionality, a BLE chipset 235 for providing BLE functionality, and a UWB chipset 250 for providing UWB functionality. The Wi-Fi chipset 220 includes one or more Wi-Fi radio transceivers 225 configured to perform Wi-Fi RF transmission and reception, and one or Wi-Fi baseband processors 230 configured to perform Media Access Control (MAC) and physical layer (PHY) modulation/demodulation processing. The BLE chipset 235 includes a BLE radio transceiver 240 configured to perform BLE RF transmission and reception, and a BLE baseband processor 245 configured to perform BLE baseband modulation and demodulation. The UWB chipset 250 includes a UWB radio transceiver 255 configured to perform UWB RF transmission and reception, and a UWB baseband processor 260 configured to perform UWB baseband modulation and demodulation. For example, the Wi-Fi chipset 220, BLE chipset 235, and UWB chipset 250 may be implemented in one or more application-specific integrated circuits (ASICs), field-programmable gate arrays (FPGAs) or other digital logic embodied in one or more integrated circuits.

The access point 200 includes one or more processors 205, which may embody or include one or more microprocessors and/or microcontrollers. In addition, the access point 200 includes a memory 210 that stores control logic 215. The processor(s) 205 are configured to execute instructions of the control logic 215 to execute various control functions for the access point 200.

As would be understood by a person of ordinary skill in the art, the features and functionality of the access point 200 are illustrative and can vary in alternative example embodiments. For example, the access point 200 may include more, less, or different chipsets in alternative example embodiments. In particular, the access point 200 may not include the Wi-Fi chipset 220 if the access point 200 does not include Wi-Fi functionality; the access point 200 may not include the BLE chipset 235 if the access point 200 does not include BLE functionality; and the access point 200 may not include the UWB chipset 250 if the access point 200 does not include UWB functionality. In addition, as would be recognized by a person of ordinary skill in the art, the access point 200 may include one or more additional components, such as a network interface to provide an IEEE 802.11 connection, Ethernet connection, or other connection, which are not depicted in FIG. 2 for purposes of simplicity.

Figure 3:
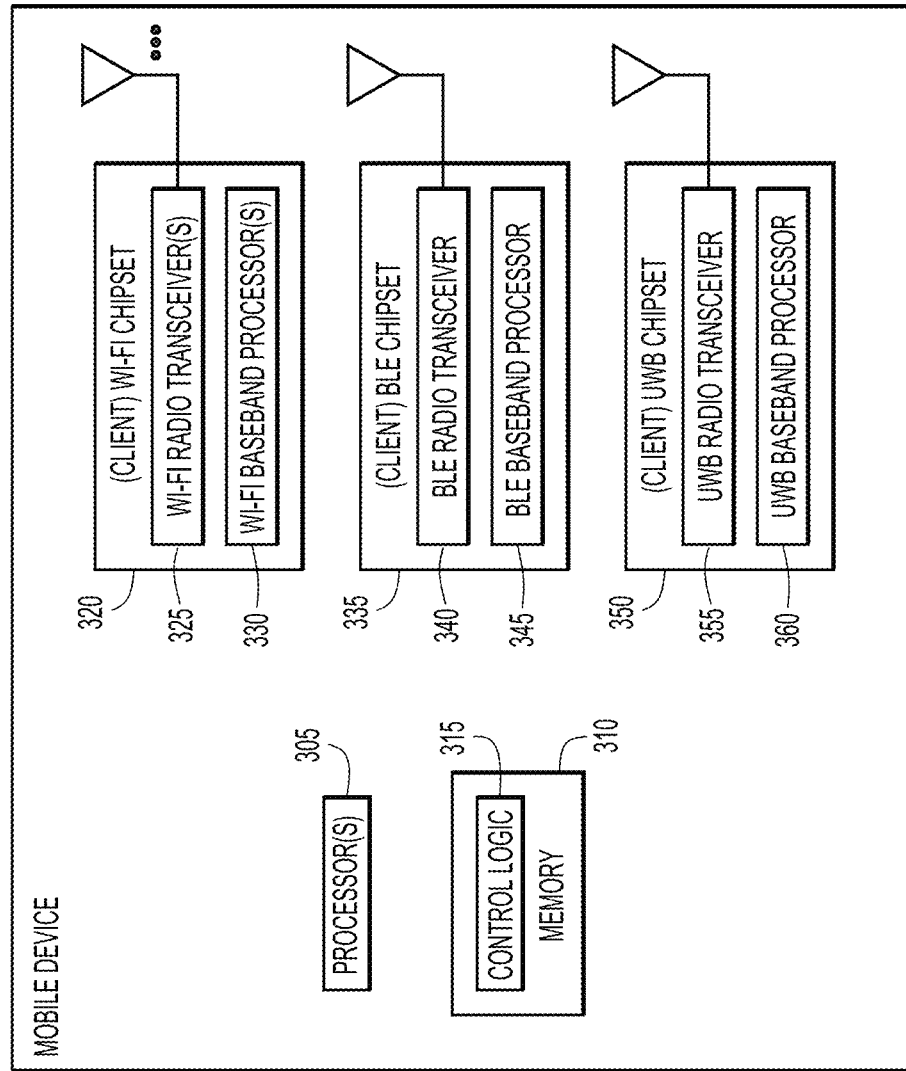
FIG. 3 is a block diagram of a mobile device configured to participate in the techniques presented herein, according to an example embodiment.

FIG. 3 is a block diagram of a mobile device 300, according to an example embodiment. As would be appreciated by a person of ordinary skill in the art, the mobile device 300 includes chipsets similar to the chipsets of an access point, though with configurations for client-side operations and mobile device/battery-powered use cases. In particular, as with the access point 200 described above in connection with FIG. 2, the mobile device 300 includes a Wi-Fi chipset 320 for providing Wi-Fi functionality, a BLE chipset 335 for providing BLE functionality, and a UWB chipset 350 for providing UWB functionality, with the Wi-Fi chipset 320 including one or more Wi-Fi radio transceivers 325 and one or Wi-Fi baseband processors 330, the BLE chipset 335 including a BLE radio transceiver 340 and a BLE baseband processor 345, and the UWB chipset 350 including a UWB radio transceiver 355 and a UWB baseband processor 360. The mobile device 300 also includes one or more processors 305 (e.g., microprocessor(s) and/or microcontroller(s)) and a memory 310 that stores control logic 315.

As would be understood by a person of ordinary skill in the art, the features and functionality of the mobile device 300 are illustrative and can vary in alternative example embodiments. For example, as with the access point 200 depicted in FIG. 2, the mobile device 300 can include more, less, or different components in alternative example embodiments.

Figure 4:
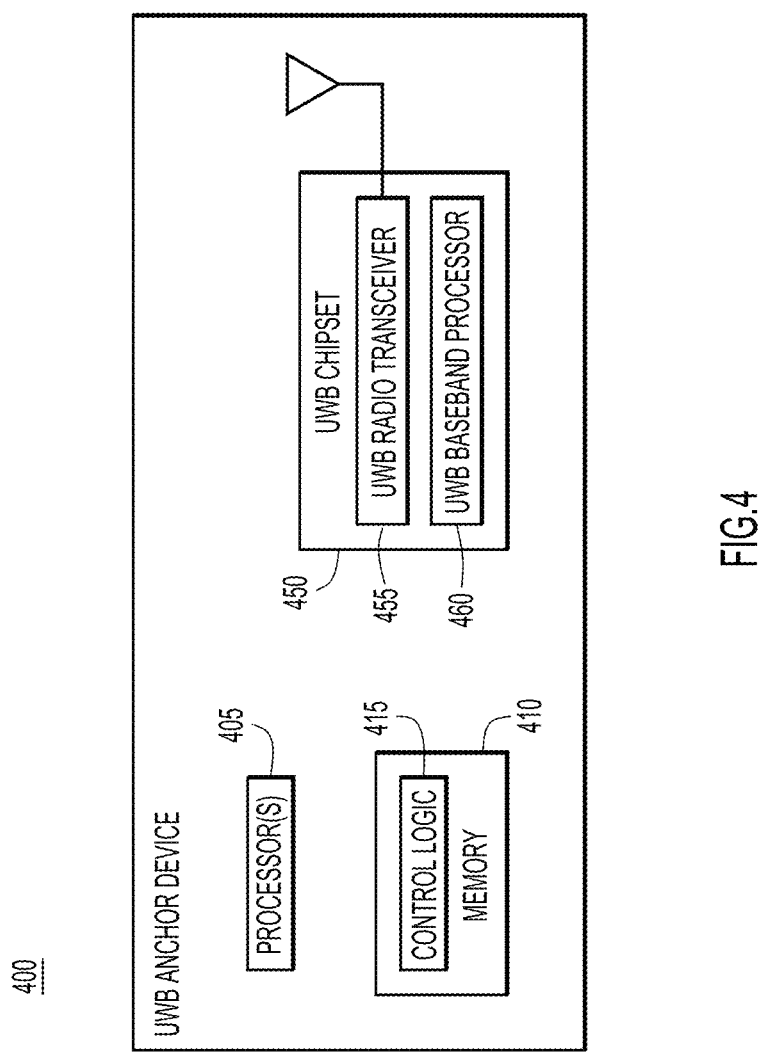
FIG. 4 is a block diagram of a UWB anchor device configured to participate in the techniques presented herein, according to an example embodiment.

FIG. 4 is a block diagram of a UWB anchor device 400, according to an example embodiment. The UWB anchor device 400 can be, for example, a standalone UWB anchor device or a peripheral UWB anchor device. Accordingly, the UWB anchor device 400 may include some, but not all, of the features depicted in FIGS. 2 and 3 for example access point 200 and mobile device 300, respectively. In particular, while the UWB anchor device 400 includes a UWB chipset 450 (with a UWB radio transceiver 455 and UWB baseband processor 460), as well as one or more processors 405 (e.g., microprocessor(s) and/or microcontroller(s)) and a memory 410 that stores control logic 415, the UWB anchor device 400 does not include a Wi-Fi chipset or BLE chipset.

However, the UWB anchor device 400 may include these features, and/or other features not depicted in FIG. 4, in alternative example embodiments. For example, the UWB anchor device 400 can include additional communication capabilities beyond UWB, such as BLE wireless communication capabilities and/or wired communication capabilities, in alternative example embodiments. In addition, as noted above, the UWB anchor device 400 (or functionality thereof) may be integrated in, or connected to, a radio device, such as the access point 200, which may include the same or different components than those depicted in the UWB anchor device 400 of FIG. 4.

Figure 5A:
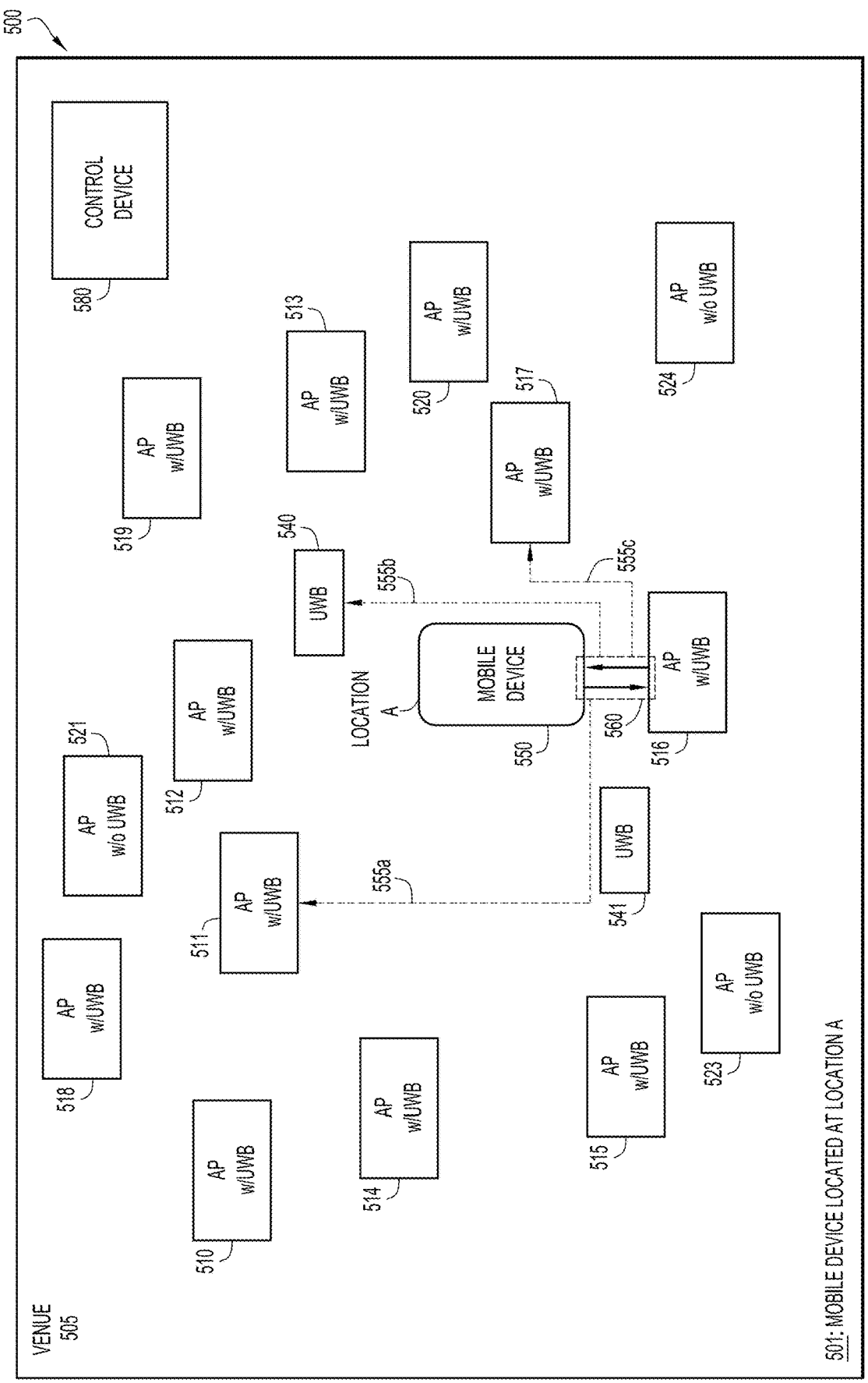
FIGS. 5A and 5B are diagrams depicting operations for dynamic anchor assignments for UWB ranging, according to an example embodiment.
Figure 5B:
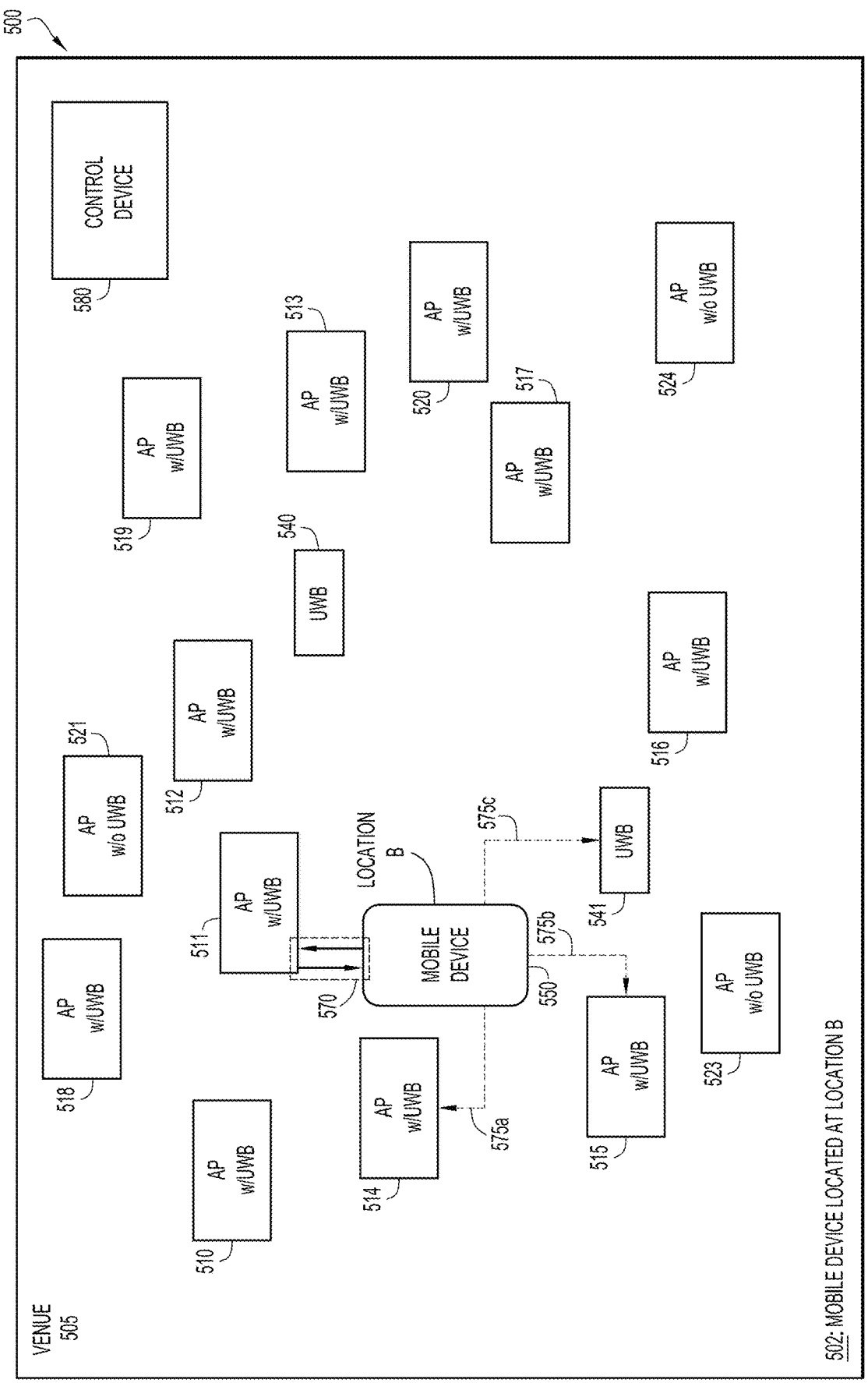

Turning now to FIGS. 5A and 5B, an example operational flow 500 for dynamic anchor assignments for UWB ranging is now described. Referring first to FIG. 5A, in a first stage 501, a mobile device 550 has entered a venue 505. The venue 505 includes any indoor or outdoor area, such as a home, school, campus, office building, conference center, stadium, or other venue or location or portion thereof. The venue 505 includes a plurality of access points 510-521, 523, and 524, and a plurality of standalone UWB anchor devices 540 and 541. Certain of the access points, namely access points 510, 511, 512, 513, 514, 515, 516, 517, 518, 519 and 520 (the "APs w/UWB"), have UWB functionality, while certain other of the access points, namely access points 521, 523, and 524 (the "APs w/o UWB"), do not have UWB functionality. As described above, each of the APs w/UWB 510-520 can achieve UWB functionality either by including built-in/integrated UWB functionality or by being connected to a peripheral UWB anchor device or other device with UWB functionality. For simplicity, the UWB functionality for each of the APs w/UWB 510-520 is described below with reference to the APs w/UWB 510-520, though it is to be understood that such functionality may be provided by, or involve, a peripheral UWB device or other device connected to the APs 510-520.

A control device 580 is configured to cooperate with the access points (510-521, 523, and 524), standalone UWB anchor devices 540 and 541, and/or mobile device 550 to provide client ranging for the mobile device 550. For example, the control device 580 can be configured to cause client ranging procedures to be initiated upon entry of the mobile device 550 into the venue 505, e.g., by assigning one or more of the APs w/UWB 510-520 and/or standalone UWB anchor devices 540 and 541 as a primary anchor for completing a location exchange with the mobile device 550 and other of the APs w/UWB 510-520 and/or standalone UWB anchor devices 540 and 541 as secondary anchors for passively receiving transmissions involving the mobile device 550 for location processing. The control device 580 also may be configured to dynamically adjust the anchor assignment if, and as, the mobile device 550 moves within the venue 505. Though depicted as being disposed within the venue 505, it should be understood that the control device 580 may be located remote from the venue 505, e.g., in a cloud-based solution, in alternative example embodiments.

In the stage 501 as shown in FIG. 5A, the mobile device 550 is located at a location A and has been assigned by the control device 580 to complete UWB ranging with AP 516 serving as a primary anchor and AP 511, AP 517, and standalone UWB anchor device 540 serving as secondary anchors. In particular, the control device 580 has caused AP 516 to complete a location exchange 560 with the mobile device 550, and AP 511, AP 517, and standalone UWB anchor device 540 to passively receive the transmission(s) that the mobile device 550 sends to AP 516 (as the primary anchor) and the transmission(s) that AP 516 (as the primary anchor) sends to the mobile device 550, as shown at 555a, 555b, and 555c. For example, each of the secondary UWB anchors can report to a controller of the control device 580 each frame it detects, and to a location engine of the control device 580, each frame that allows computation of a range. In addition, or in the alternative, devices within RF proximity of the primary anchor (AP 516), including the secondary anchors (AP 511, AP 517, and standalone UWB anchor device 540) and potentially other devices in the venue 505, can collect, and/or report to the control device 580, information such as mobile device MAC address, primary anchor MAC address, detecting (i.e., reporting) device MAC address, RSSI, pulse identifier, timestamp, etc. The information collected by, and/or reported to, the control device 580 can be used by the control device 580 both for location tracking and to establish collision map information, which may be used by the control device 580 to dynamically re-assign anchors, as described in more detail below.

In a second stage 502 (shown in FIG. 5B), the mobile device 550 has moved to a location B. The control device 580 is configured to detect this movement, e.g., based on information from one or more of the access points (510-521, 523, and 524), standalone UWB anchor devices 540 and 541, and/or mobile device 550, and to dynamically adjust the anchor assignment as appropriate in response to the movement. For example, the control device 580 can initiate an anchor reassignment in response to a signal strength between the mobile device 550 and AP 516 (i.e., the previous primary anchor for the mobile device 550) falling below a predetermined handover threshold. The signal strength may be detected by, or reported to, the control device 580, e.g., by one or more of the access points (510-521, 523, and 524), standalone UWB anchor devices 540 and 541, and/or mobile device 550.

The control device 580 can identify one or more UWB anchor devices other than the AP 516 as potential new primary UWB anchors for the mobile device 550. For example, the control device 580 can identify one or more of the APs w/UWB 510-515 and 517-520, and the standalone UWB anchor devices 540 and 541 as potential new primary UWB anchors. In an example embodiment, the control device 580 identifies (e.g., from the set of APs w/UWB 510-515 and 517-520 and the standalone UWB anchor devices 540 and 541) one or more anchor devices for which the mobile device 550 has had a signal strength above the handover threshold during a predetermined period of time.

The control device 580 can select from those anchor devices a new primary anchor and a set of one or more secondary anchors for the mobile device 550. For example, the control device 580 can select the new primary anchor by computing collision map information, including, e.g., a relative collision tolerance mapping. In an example embodiment, the control device 580 can compute the relative collision tolerance mapping by using a cross-correlation of one or more temporal probability collision maps and one or more geometric collision maps, along with signal levels (and/or other information) when collisions have occurred. Example operations for computing a relative collision tolerance mapping are described in more detail below.

In the example depicted in FIG. 5B, the control device 580 has assigned AP 511 as the new primary anchor for the mobile device 550 and AP 514, AP 515, and UWB anchor device 541 as secondary anchors for the mobile device 550. In particular, the control device 580 has caused AP 511 to complete a location exchange 570 with the mobile device 550, and AP 514, AP 515, and UWB anchor device 541 to passively receive the transmission(s) that the mobile device 550 sends to AP 511 (as the primary anchor) and the transmission(s) that AP 511 (as the primary anchor) sends to the mobile device 550, as shown at 575a, 575b, and 575c.

Figure 6:
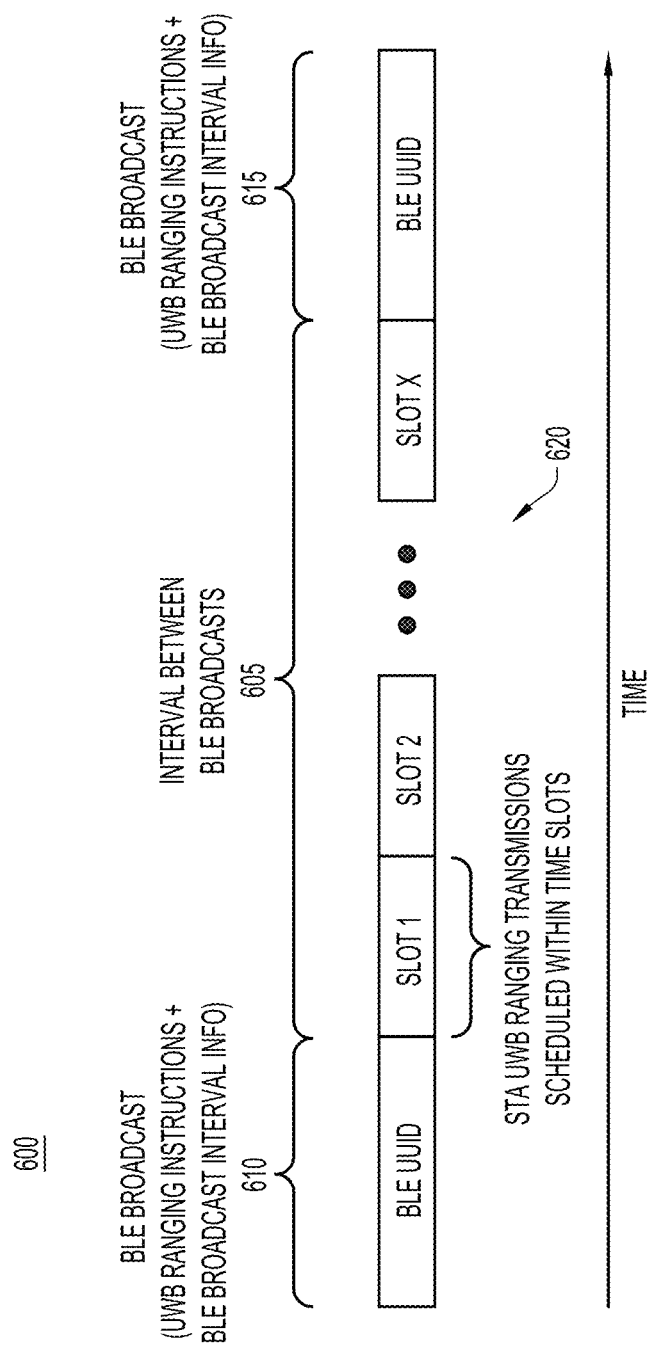
FIG. 6 is a diagram depicting how UWB ranging operations may be assigned between BLE broadcasts, according to an example embodiment.

FIG. 6 is a diagram depicting how UWB ranging operations may be assigned between BLE broadcasts, according to an example embodiment. In particular, FIG. 6 shows a Time Division Multiple Access (TDMA) operation 600 in which a BLE broadcast interval 605, i.e., a time between two BLE universally unique identifier (UUID) broadcasts (610, 615), is divided into a plurality of time slots 620. A control device (such as control device 180 or control device 580 described above with reference to FIGS. 1 and 5A/5B, respectively) is configured to schedule a signal transmission for UWB ranging (e.g., a transmission between a mobile device and a primary anchor) during each of the time slots 620. For example, the BLE broadcasts 610 and 615 can include UWB ranging instructions, including applicable interval and time slot information for the UWB ranging. It should be appreciated that the TDMA operation 600 is illustrative and can vary in alternative example embodiments.

Figure 7:
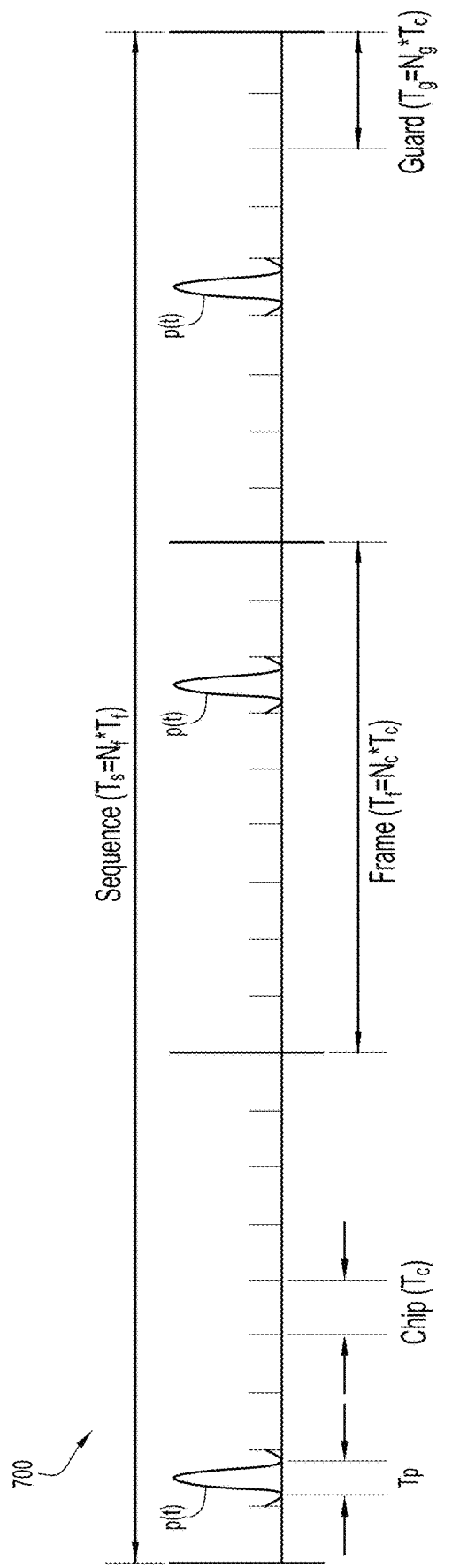
FIG. 7 is a diagram depicting chip assignments for transmission of UWB pulses for UWB ranging, according to an example embodiment.

FIG. 7 is a diagram depicting chip assignments for transmission of UWB pulses for UWB ranging, according to an example embodiment. As illustrated in FIG. 7, a signal 700 may include a series of pulses p(t) of duration Tp (e.g., measured in nanoseconds). The signal 700 is conveyed by repeating the pulses p(t) over Nf frames, with one pulse p(t) per frame (of frame duration Tf>>Tp), resulting in a low duty cycle transmission form.

Each frame includes Nc chips, each of a chip duration Tc. In order to avoid collisions between neighboring systems, UWB ranging may utilize a hopping sequence, which means that, within each frame, the UWB system picks a chip index during which the signal 700 will be sent. By changing the Tc index used to transmit from one frame to the next, a UWB transmitter minimizes the risk of collision between competing transmitters. However, collisions still may occur, particularly when there is a high density of devices completing UWB ranging operations.

For example, an anchor may receive a signal stronger than it should receive, or that it cannot demodulate effectively, or may send a response that is not received, etc. In most cases, the collision is detected, but the detector does not know the source of the collision (because the message is scrambled by the collision and, thus, cannot be read). However, because the control device has knowledge about which device was supposed to communicate with which other device, a possible source/cause can be inferred. For example, if a particular anchor tells the control device that it sent a message to a particular mobile device and did not receive a reply, while the particular anchor and another anchor received a strong pulse they could not decipher at that time, the control device can determine that there was a collision between the message and the pulse. It should be appreciated, though, that there could be more than one possible source of a collision. Moreover, it should be appreciated that the chip assignments depicted in FIG. 7 are illustrative and can vary in alternative example embodiments.

Figure 8:
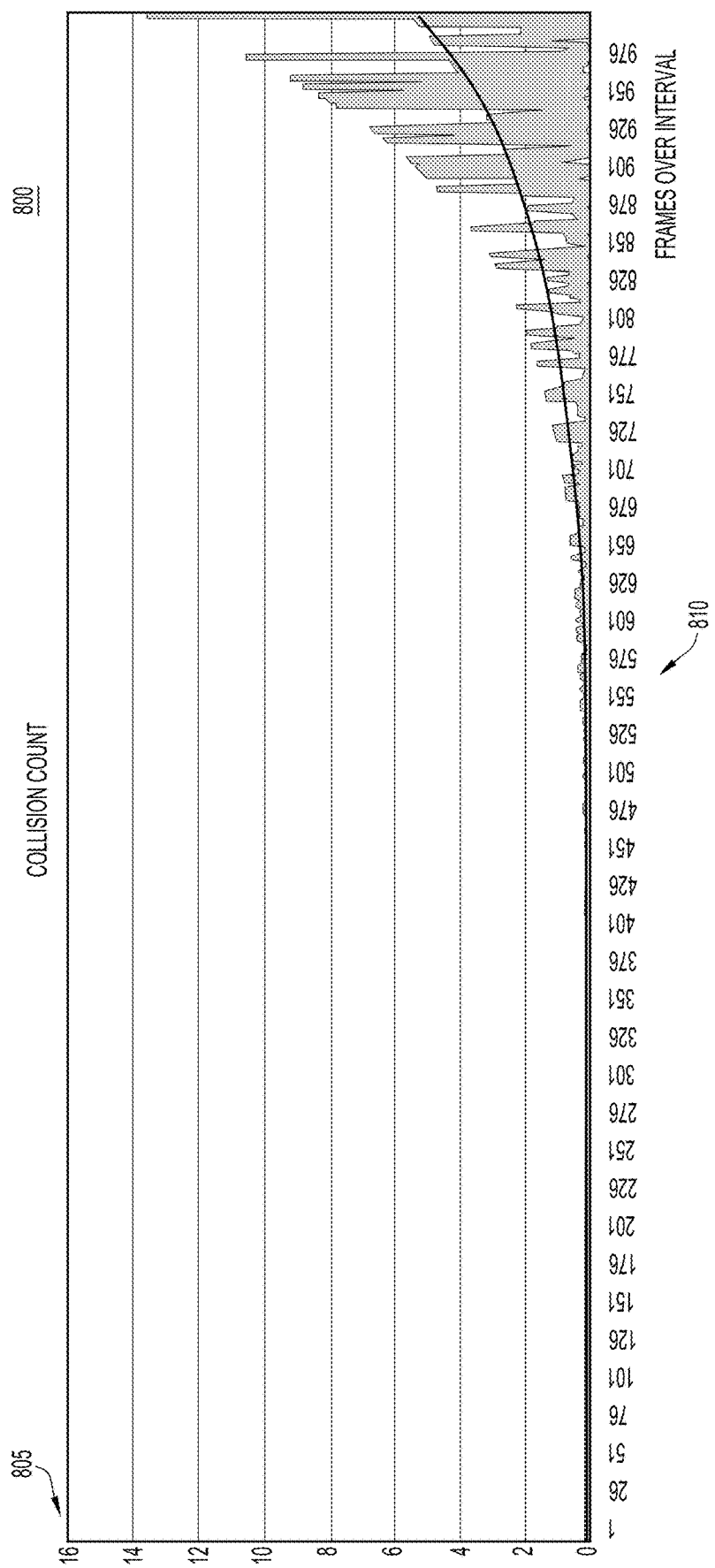
FIG. 8 is a diagram depicting collision counts tracked by techniques presented herein, as part of dynamic anchor assignments for UWB ranging, according to an example embodiment.

FIG. 8 is a diagram depicting collision counts 800 tracked in connection with UWB ranging operations, according to an example embodiment. For example, an AREA engine of a control device can be configured to compute, for each reported UWB ranging exchange, {frame count, collision-free chip count, collided chip count} and/or other information related to the UWB ranging exchange and any collisions thereof. A chip collision occurs when two mobile devices use the same Nc chip within a given frame to send the Tc chip. For example, this can result in a Burst Position Modulation-Binary Phase Shift Keying (BPM-BPSK) pulse with the wrong intensity. For example, for each UWB anchor in a particular space, the AREA engine can compute a number of frames reported for a given interval (e.g., 1 second, though the interval could be more or less than 1 second), along with a number of collisions. The frames reported may include, e.g., frames detected by the UWB anchor for its own mobile device traffic and/or frames detected by the UWB anchor from mobile devices in UWB proximity to the UWB anchor ranging with other UWB anchors. As shown in the example collision counts 800, a number of collisions 805 may generally increase as a number of frames for a given interval 810 increases.

Figure 9:
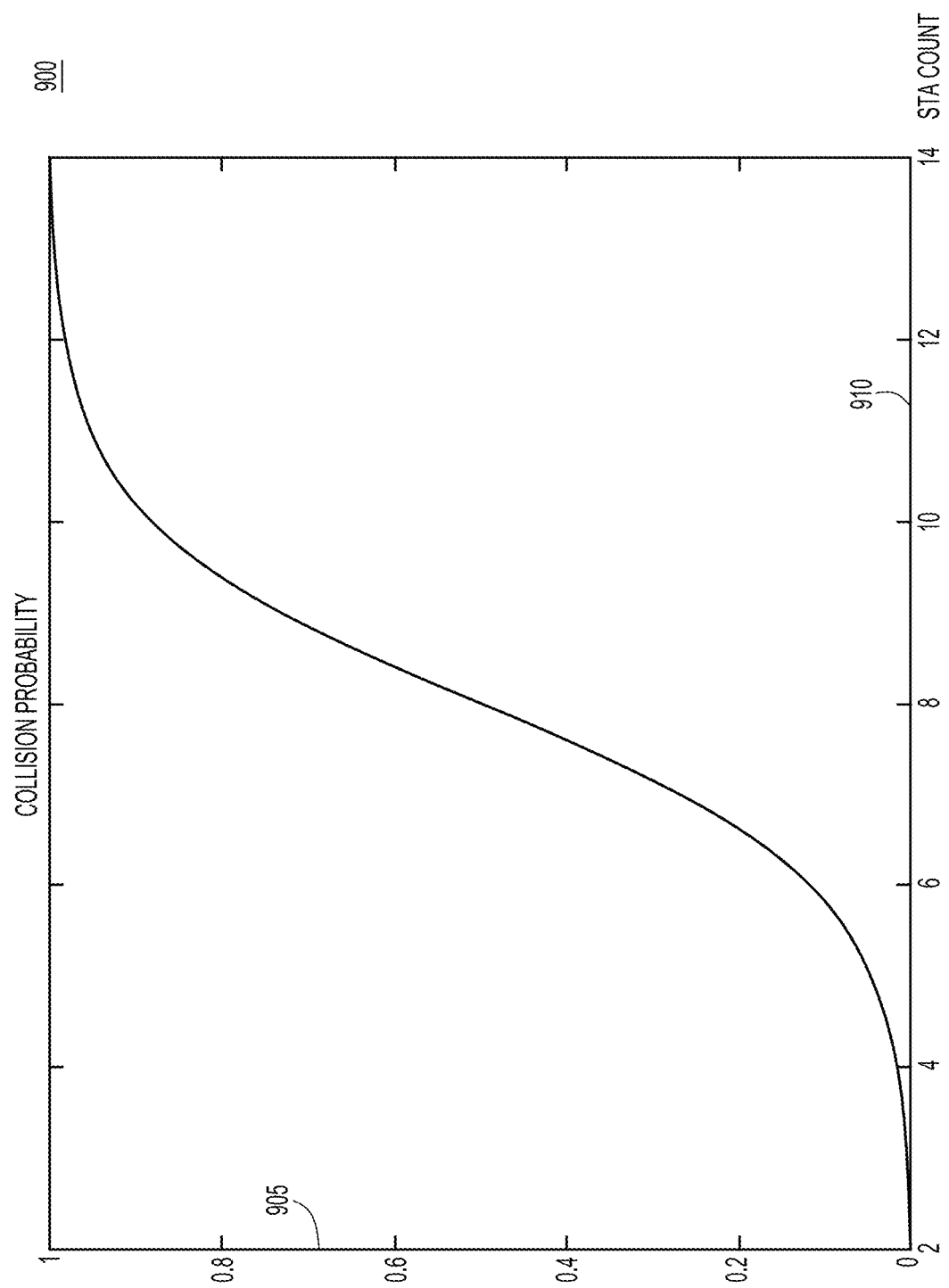
FIG. 9 is a diagram illustrating a temporal probability collision map generated by techniques presented herein, as part of dynamic anchor assignments for UWB ranging, according to an example embodiment.

FIG. 9 is a diagram illustrating a temporal probability collision map 900 computed in connection with UWB ranging operations, according to an example embodiment. The temporal probability collision map 900 indicates, for a particular UWB anchor, a collision probability 905 for a count 910 of mobile devices ranging against the particular UWB anchor. For example, the temporal probability collision map 900 can indicate, for the particular UWB anchor, a change in collision probability 905 if the count 910 of mobile devices ranging against the particular UWB anchor increases (or otherwise changes).

In an example embodiment, an AREA engine of a control device can be configured to compute the collision probability 905 by tracking collision counts (e.g., as described above with reference to FIG. 8), along with numbers of mobile devices (e.g., by source MAC address) completing UWB ranging operations. For example, the AREA engine can count collisions over a period of time and map the collisions against the applicable anchors and mobile devices to compute the collision counts and/or collision probability 905. The AREA engine also can consider in calculating the collision probability 905, for example, density of the mobile devices, their movements, and their risk of disrupting other mobile devices. For example, the AREA engine can be configured to extrapolate a future position of a mobile device (e.g., using a regression technique) based on its direction of displacement (determined from its successive ranging exchanges) and thus deduce not only its current collision risk but also its future collision risk ("risks in a few seconds"). Thus, the AREA engine can point not only to the best anchor "now," but also to the best anchor "now and for the next few seconds to come as you (the mobile device) keep moving."

It should be appreciated that the temporal probability collision map 900 is illustrative and can vary in alternative example embodiments. For example, the temporal probability collision map 900 can include more or less details regarding the collision probability 905 and mobile device count 910 in alternative example embodiments. In addition, the temporal probability collision map 900 could constitute a collection of data in a form other than the form depicted in FIG. 9, such as one or more tables, charts, etc., which may or may not include a "map" or other diagram/drawing visually representing the collision probability 905, mobile device count 910, etc.

Figure 10:
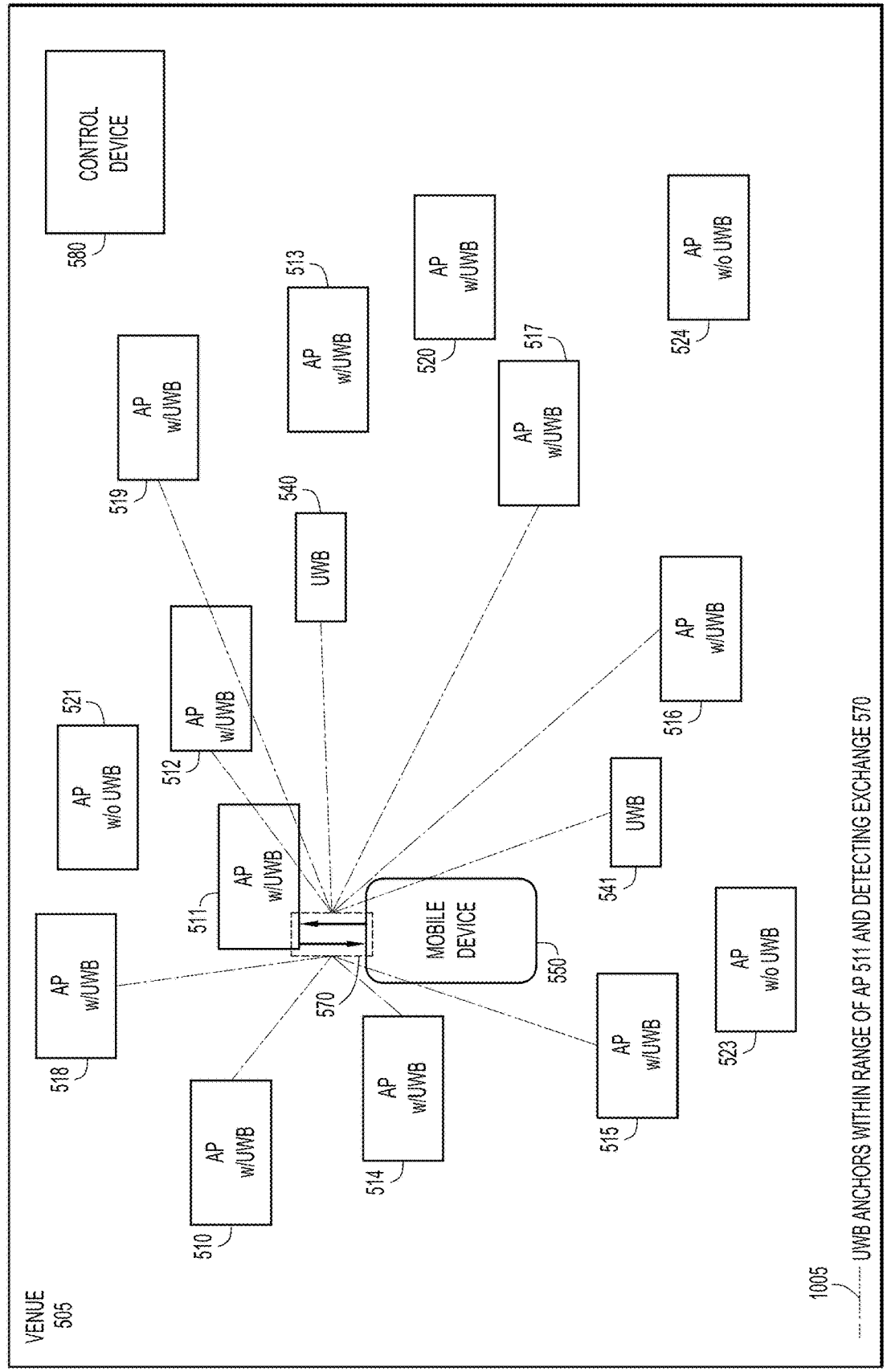
FIG. 10 is a diagram illustrating a geometric collision map generated by techniques presented herein, as part of dynamic anchor assignments for UWB ranging, according to an example embodiment.

FIG. 10 is a diagram illustrating a geometric collision map 1000 computed in connection with UWB ranging operations, according to an example embodiment. Generally, a geometric collision map identifies, for a particular UWB anchor, other UWB anchors that have each detected at least one mobile device-to-anchor exchange involving the particular UWB anchor over a period of time. Thus, the geometric collision map indicates (e.g., on a map, for each square of a grid, or otherwise) what ranging against any possible UWB anchor might mean in terms of detections by/from other UWB anchors. For example, an AREA engine of a control device 580 may be configured to compute a geometric collision map for each anchor and detected ranging exchange in a venue 505. In the example geometric collision map 1000, it is shown (at 1005) that, for AP 511 (as the primary anchor for mobile device 550), AP 510, AP 518, AP 512, AP 519, standalone UWB anchor device 540, AP 517, AP 516, UWB anchor device 541, AP 515, and AP 514 have each detected at least one location exchange 570 involving AP 511 and the mobile device 550.

In an example embodiment, the detecting may reflect, or be affected by, a minimum detection threshold established and/or managed by a control device 580. For example, the AREA engine may provide that any UWB transmission (pulse) from a mobile device will be ignored if it has a strength below a predetermined threshold. The threshold may be manually configured or be based on one or more anchor characteristics. For example, an anchor having a first type or model may have a detection threshold of about 99 dBm, while another anchor having a second type or model may have a detection threshold of about 94 dBm. It should be appreciated, however, that the detection threshold may vary or be omitted in different example embodiments.

The AREA engine may be further configured to overlap individual geometric collision maps with one another to identify and/or determine collision risk. For example, when a first mobile device ranges with a first anchor, and a second mobile device ranges with a second anchor, there may be a collision risk if all of these devices are in range with one another. Overlapping the geometric collision maps may allow the AREA engine to quantify this risk.

In an example embodiment, the AREA engine may be configured to consider (e.g., within, or in connection with, the geometric collision maps) physical distance, signal strength, signal complexity, and other information, which may impact a likelihood of collision risk. For example, the AREA engine may determine that a collision risk is present but relatively low if the geometric collision maps indicate that UWB signals from the first mobile device are barely heard/detected by the second anchor (when the first anchor is heard/detected by the second anchor), e.g., because of a physical distance between the devices and/or a relative signal strength or complexity.

As would be understood by a person of ordinary skill in the art, the features, structure, layout, and design of the geometric collision map 1000 is illustrative and can vary in alternative example embodiments. For example, the geometric collision map 1000 can include more or less details regarding the venue 505, devices, the detected ranging exchanges, and their respective locations, in alternative example embodiments. In addition, the geometric collision map 1000 could constitute a collection of data in a form other than the form depicted in FIG. 10, such as one or more tables, charts, etc., which may or may not include a "map" or other diagram/drawing visually representing the venue 505, devices, or detected ranging exchanges.

In an example embodiment, the AREA engine can be configured to cross-correlate at least one temporal probability collision map (such as the temporal probability collision map 900) and at least one geometric collision map (such as the geometric collision map 1000) to build a relative collision tolerance mapping (also called a "collision tolerance map"). The relative collision tolerance mapping can include a pairwise mapping between a plurality of UWB anchors, which indicates, for a given count of mobile devices ranging against a particular one of the UWB anchors, a probability that a mobile device ranging against another of the UWB anchors would cause a destructive collision with the particular one of the plurality of UWB anchors.

Figure 11A:
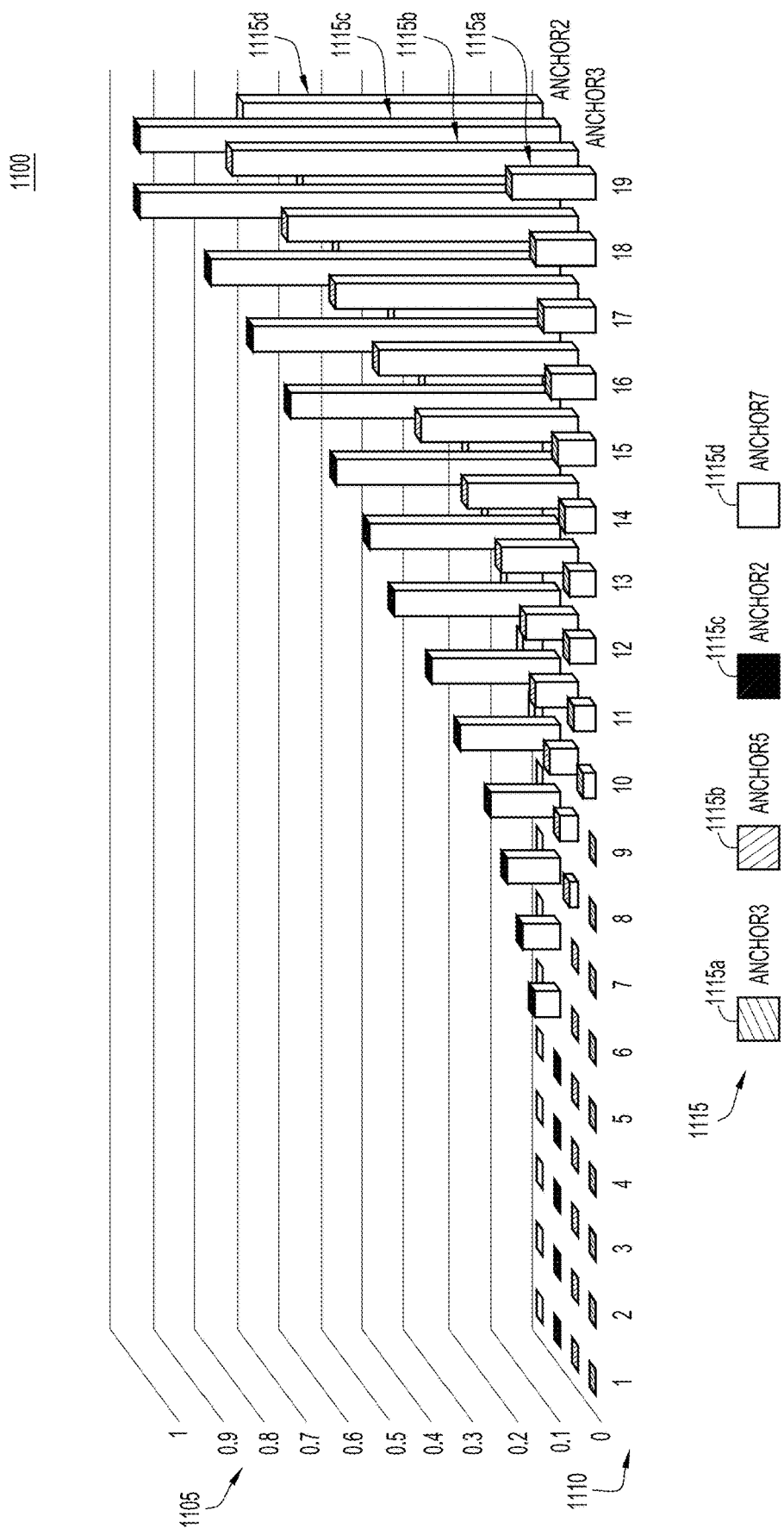
FIG. 11A is a diagram depicting a collision tolerance map generated by techniques presented herein, as part of dynamic anchor assignments for UWB ranging, according to an example embodiment.

FIG. 11A is a diagram depicting a collision tolerance map 1100 computed in connection with UWB ranging operations, according to an example embodiment. The collision tolerance map 1100 shows a destructive collision probability 1105 that a mobile device may have with one or more of a plurality of UWB anchors 1115 (including anchors 1115a, 1115b, 1115c, and 1115d) if and as the mobile device moves, over time and relative to other mobile devices (e.g., along the x-axis 1110), in a venue. For example, per the collision tolerance map 1100, when each of the anchors 1115 has 19 mobile devices ranging, anchor 1115c will experience destructive collisions almost 100% of the time (vertical axis is at approximately 0.95), while anchor 1115a will experience destructive collisions only about 20% of the time. Similarly, when each of the anchors 1115 has one or only a few mobile devices ranging, it is expected in the collision tolerance map 1100 that each of the anchors 1115 will experience minimal destructive collisions.

Figure 11B:
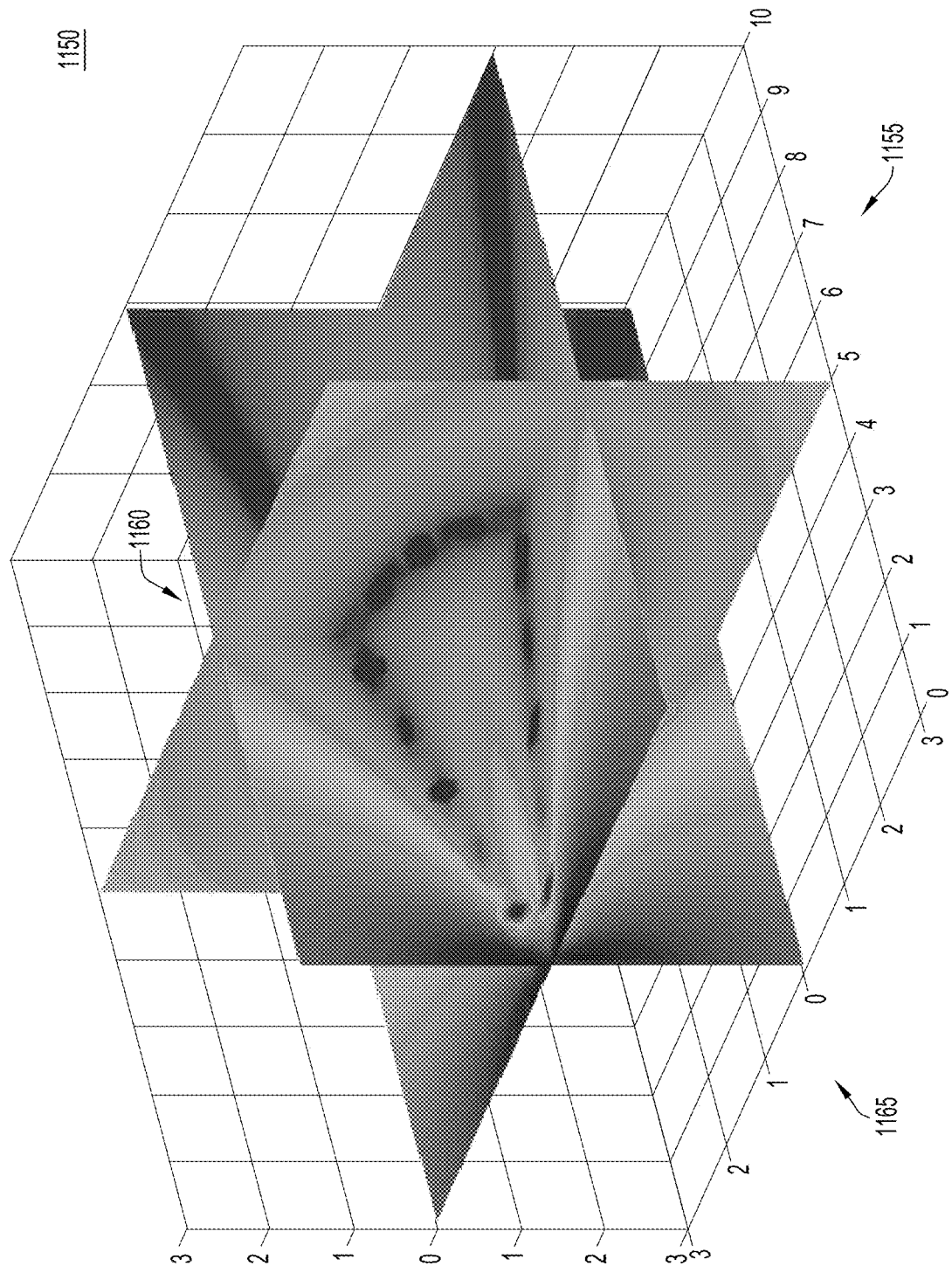
FIG. 11B is a diagram depicting another collision tolerance map generated by techniques presented herein, as part of dynamic anchor assignments for UWB ranging, according to an example embodiment.

It should be appreciated that the diagram depicted in FIG. 11A is simplified for illustrative purposes. In particular, while the collision tolerance map 1100 includes three dimensions, with each of the anchors 1115 having a same number of ranging mobile devices (along the x-axis 1110), the collision tolerance map 1100 may have four dimensions to reflect that each of the anchors 1115 can have a different number of ranging mobile devices, in alternative example embodiments. For example, FIG. 11B illustrates a slice representation of an example collision tolerance map 1150, which shows, for a given number of mobile devices ranging on a first anchor 1155, the collision risk 1160 based on the number of mobile devices 1165 on second and third anchors. The collision risk 1160 is indicated in a grayscale heat map, in which shade gradations are intentional and represent data (e.g., relative collision risk).

As noted above, a "destructive collision" is a collision that causes a UWB anchor not to receive a signal intended for the UWB anchor at a level sufficient for the UWB anchor to interpret the signal. A collision may be considered "non-destructive," for example, if a UWB anchor receives a signal, which reflects the occurrence of the collision but nevertheless is at a level sufficient for the UWB anchor to interpret the signal. The AREA engine can be configured to compute and reflect in the probability 1105 a differentiation (e.g., by applying one or more different weights and/or filters) between potential destructive collisions and potential non-destructive collisions. For example, the AREA engine can use a cross-correlation of the temporal probability collision map(s) and the geometric collision map(s), along with signal levels when collisions have occurred (e.g., based on collision information collected or computed by the AREA engine, which may or may not be reflected in the temporal probability collision map and/or geometric collision map), to compute the collision tolerance map 1100/ 1150 to reflect the probability 1105/1160 of destructive collisions.

The AREA engine can, e.g., compare collided chips between anchor pairs (when two mobile devices range against two anchors and result in a collided chip) to determine to what degree a particular collision was destructive. For example, when mobile devices are close to each other, and when anchors are close to each other, collisions may be highly destructive, with intended signals being impacted such that they cannot meaningfully be read. However, as the distance between anchors increases, the effects of the collisions may be reduced, as the anchors may receive intended signals at levels sufficient to interpret pulses, even if the signal levels reflect a collision. The AREA engine can be configured to analyze these considerations, e.g., when computing the destructive collision probability 1105 in the collision tolerance map 1100 and/or the collision risk 1160 in the collision tolerance map 1150.

In an example embodiment, the collision probability 1105/collision risk 1160 can include a weighted value to reflect a degree to which any potential collision may be expected to be destructive. For example, if a collision is highly likely (e.g. p=0.78) for 2 mobile devices in given quadrants, but their relative position and the position of the anchors are expected to result in a low destructivity, for example a destructivity weight of 0.2, a collision probability score for these devices may be calculated as a product of the collision probability times the destructivity weight, i.e., 0.78 times 0.2, to yield a collision probability score of 0.39.

In an example embodiment, the AREA engine is configured to re-compute the collision tolerance map 1100/1150—and/or the temporal probability collision map, geometric collision map, or any signal or other information included or reflected in the collision tolerance map 1100/1150—at time intervals as mobile devices traverse a space. Thus, at any given moment, the AREA engine may have a real-time or near real-time view of collision risk potential within the space.

It should be appreciated that the features, structure, layout, and design of the collision tolerance maps 1100 and 1150 are illustrative and can vary in alternative example embodiments. For example, the collision tolerance map (1100, 1150) can include more or less details regarding the venue, mobile devices, anchors 1115, and their respective collision probabilities/risks (1105, 1160), in alternative example embodiments. In addition, while the collision tolerance map 1100 includes information regarding four anchors 1115 and up to 19 ranging mobile devices, and the collision tolerance map 1150 includes information regarding three anchors and up to 10 ranging mobile devices, it should be appreciated that the collision tolerance maps 1100 and 1150 can be modified to reflect any number of anchors and ranging mobile devices, as applicable for a given use case. The collision tolerance maps 1100 and 1150 also could be modified in alternative example embodiments to constitute a collection of data in in a form other than the form depicted in FIGS. 11A and 11B, such as one or more tables, charts, graphs, maps, etc.

Figure 12:
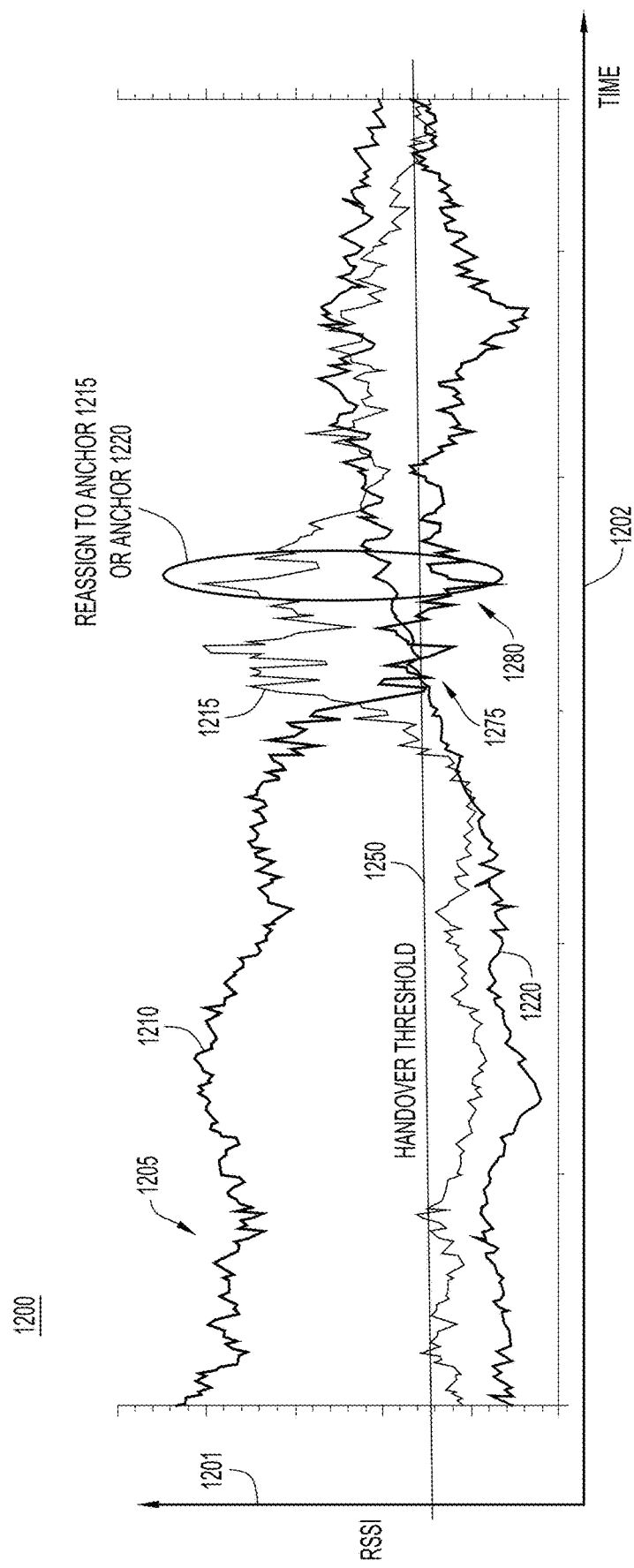
FIG. 12 is a diagram depicting an operation for selecting a new UWB primary anchor for a mobile device as the mobile device moves through a venue, according to an example embodiment.

Turning now to FIG. 12, an example operation 1200 is shown for selecting a new UWB primary anchor for a mobile device as the mobile device moves through a venue, according to an example embodiment. At a first time 1205, a signal strength 1201 (e.g., an RSSI or other value) between an anchor 1210 and a mobile device ranging against the anchor 1210—which is serving as the primary UWB anchor for the mobile device—is above a handover threshold 1250, while a signal strength 1201 between an anchor 1215 and the mobile device is fluctuating around the handover threshold 1250, and a signal strength 1201 between an anchor 1220 and the mobile device is below the handover threshold 1250. An AREA engine of a control device associated with the anchors (1210, 1215, 1220) is configured to monitor the signal strengths 1201 of the respective devices over time 1202 and relative to the handover threshold 1250, which may be any predetermined signal strength value.

As may be appreciated, a signal strength 1201 may fluctuate for a variety of reasons, including, for example, changes in a physical location, performance, etc. of the mobile device and/or anchors (1210, 1215, 1220). For example, when a mobile device moves within a space in which the anchors (1210, 1215, 1220) are fixed or otherwise relatively stationary, a relative signal strength 1201 between the mobile device and each of the anchors (1210, 1215, 1220) may increase or decrease as the mobile device moves closer or further away, respectively, from the anchors (1210, 1215, 1220). In the example depicted in FIG. 12, at a time 1275, a signal strength 1201 of the anchor 1210 has fallen below the handover threshold 1250, while signal strengths 1201 for the anchors 1215 and 1220 have increased above the handover threshold 1250. For example, these signal strength changes may reflect a situation in which the mobile device has moved away from the anchor 1210 and closer to the anchors 1215 and 1220 at or around the time 1275.

In response to determining that the signal 1201 between the mobile device and (its primary) anchor 1210 has fallen below the handover threshold, the control device initiates a procedure at time 1280 to dynamically reassign the primary UWB anchor for the mobile device. For example, the control device can identify a plurality of UWB anchors—in this case, anchors 1215 and 1220—for which the mobile device has had a signal strength above the handover threshold during a predetermined period of time, and select one of the plurality of UWB anchors as a new primary UWB anchor for the mobile device. The control device can select the new UWB anchor from the plurality of UWB anchors for which the mobile device has had the signal strength above the handover threshold during the predetermined period of time, for example, based on respective tolerance and mobile device signal levels, e.g., using one or more collision tolerance maps, temporal probability collision maps, and/or geometric collision maps computed as described above. For example, the control device can maximize {tolerance, mobile device signal} and select a primary UWB anchor with a highest relative tolerance and mobile device signal.

The control device can send a command that causes a UWB ranging procedure to be performed between the mobile device and the new primary UWB anchor. For example, in the embodiment depicted in FIG. 12, the control device can send instructions to the previous primary anchor 1210 and the new primary anchor—either anchor 1215 or anchor 1220—which indicate the anchor reassignment, and the control device and/or one or more of the anchor 1210, the anchor 1215, or the anchor 1220 can send a UUID or other message to the mobile device, instructing the mobile device to range against the new primary anchor.

It should be appreciated that the operation 1200 is illustrative and can vary in alternative example embodiments. For example, it should be appreciated that the number of anchors, the handover threshold value, the time between detecting a signal strength below the handover threshold value and the reassignment of the primary UWB anchor can vary in alternative example embodiments.

Figure 13:
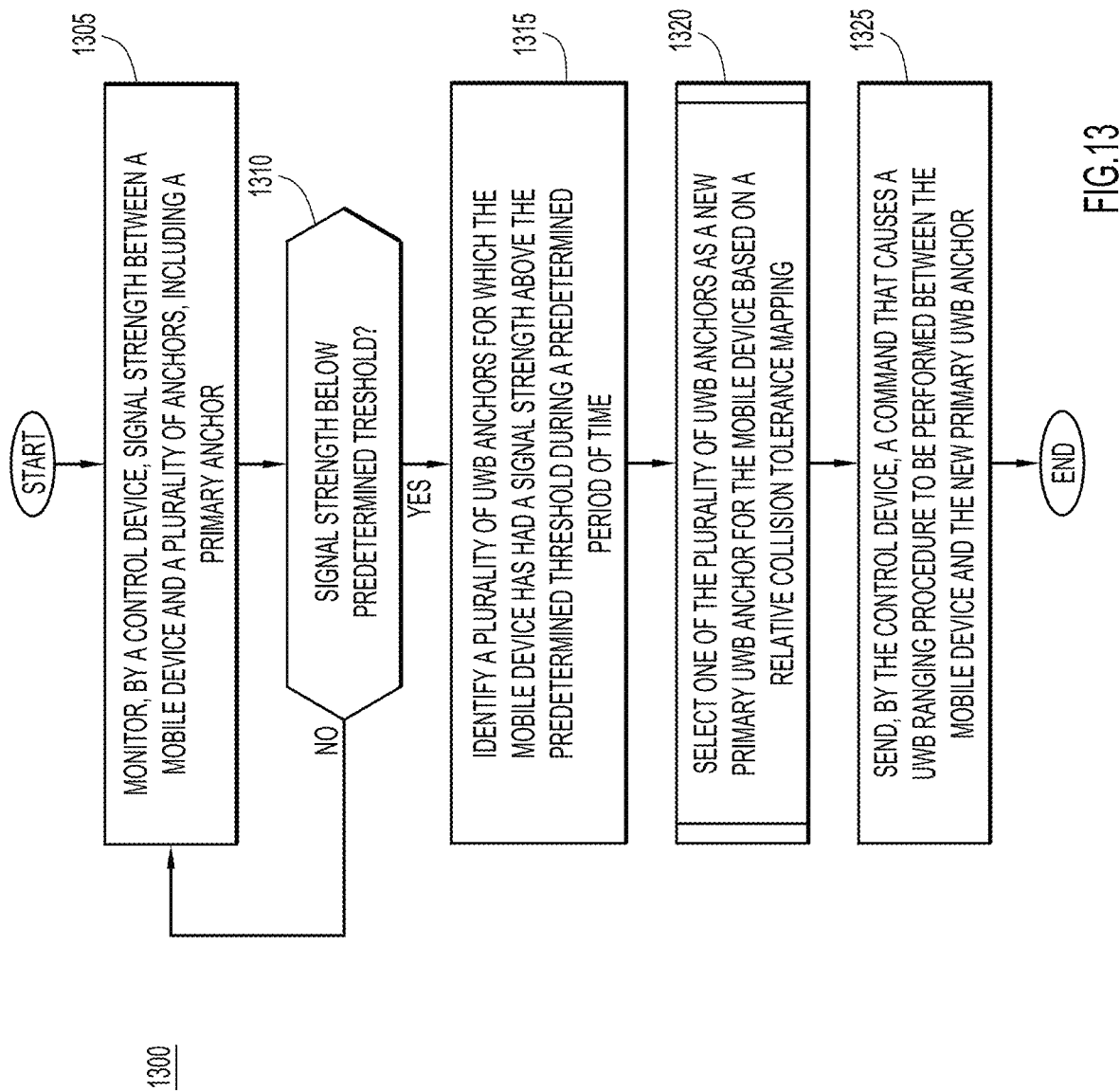
FIG. 13 is a flow chart depicting a method for dynamic anchor assignments for UWB ranging, according to an example embodiment.

Turning now to FIG. 13, an example method 1300 is shown for dynamic anchor assignments for UWB ranging, according to an example embodiment. In step 1305, a control device (e.g., at a controller, AREA engine, or location engine thereof) monitors signal strength (e.g., RSSI or another value) between a mobile device and a plurality of UWB anchors. The plurality of UWB anchors include a primary anchor that has been assigned to the mobile device for UWB ranging.

In step 1310, the control device (e.g., at the controller, AREA engine, or location engine) determines whether a signal strength between the mobile device and the primary UWB anchor is below a predetermined threshold, e.g., a handover threshold. If the control device determines in step 1310 that the signal strength is not below the predetermined threshold, then the method 1300 continues to step 1305 where the control device continues to monitor the signal strengths. If the control device determines in step 1310 that the signal strength between the mobile device and the primary UWB anchor is below the predetermined threshold, then the method 1300 continues to step 1315.

In step 1315, the control device (e.g., at the controller, AREA engine, or location engine) identifies a plurality of UWB anchors for which the mobile device has had a signal strength above the predetermined threshold during a predetermined period of time. In step 1320, the control device (e.g., at the controller, AREA engine, or location engine) selects one of this plurality of UWB anchors (for which the mobile device has had a signal strength above the predetermined threshold during the predetermined period of time) as a new primary UWB anchor for the mobile device. For example, the control device can make this selection based on a relative collision tolerance mapping. Step 1320 is described in more detail below with reference to FIG. 14.

In step 1325, the control device (e.g., at the controller, AREA engine, or location engine) sends a command that causes a UWB ranging procedure to be performed between the mobile device and the new primary UWB anchor. For example, the control device can send instructions to the old primary anchor and the new primary anchor, which indicate the anchor reassignment, and the control device and/or one or more of the anchors can send a UUID or other message to the mobile device, instructing the mobile device to range against the new primary anchor.

Figure 14:
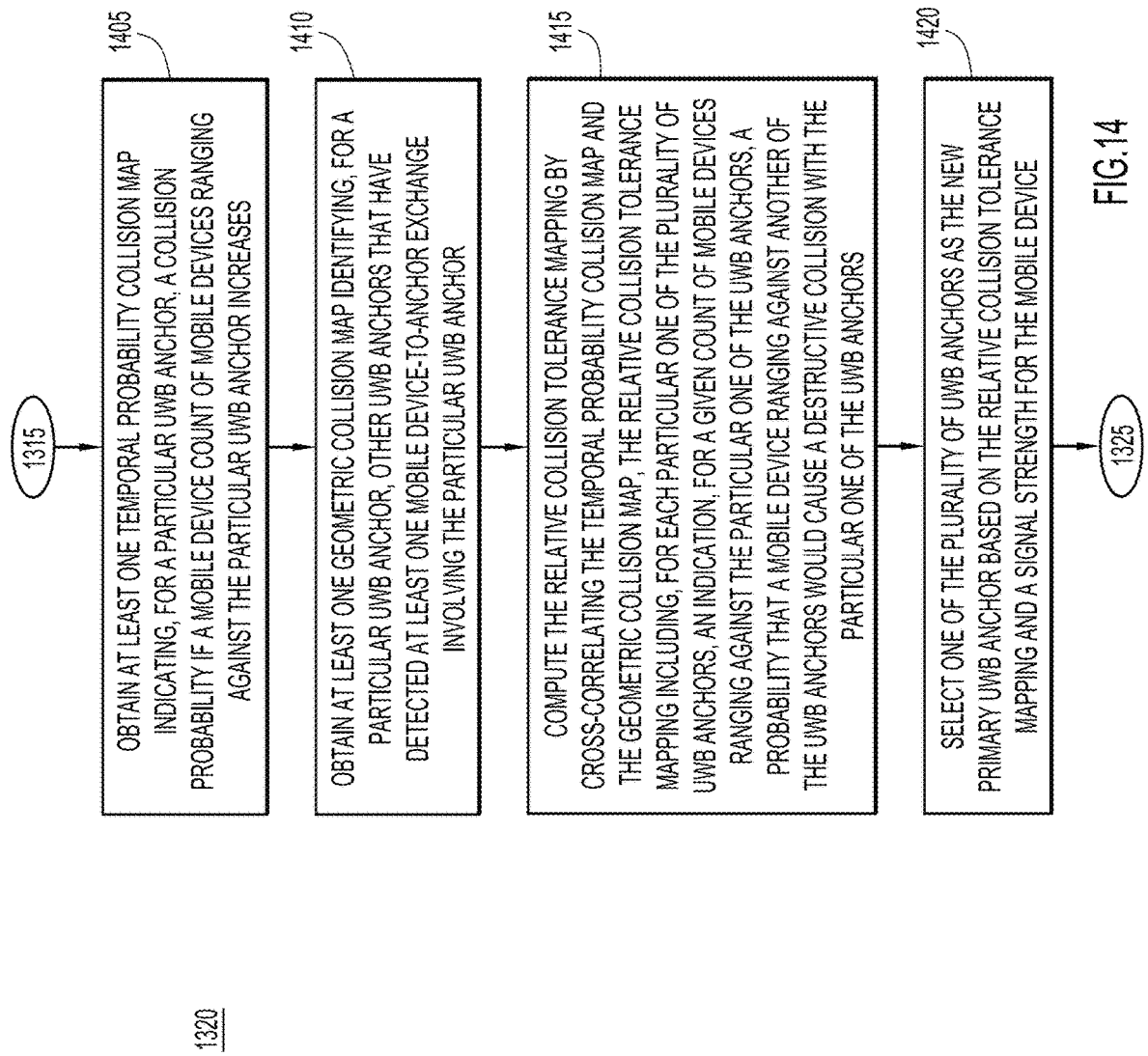
FIG. 14 is a flow chart depicting a method for selecting a new UWB primary anchor for a mobile device, according to an example embodiment.

FIG. 14 is a flow chart depicting in more detail operations that may be performed at step 1320 for selecting a new UWB anchor for a mobile device, according to an example embodiment. The operations of step 1320 continue from step 1315 of the method 1300 described above. In step 1405, the control device obtains at least one temporal probability collision map indicating, for a particular UWB anchor, a collision probability if a mobile device count of mobile devices ranging against the particular UWB anchor increase. For example, the temporal probability collision map can be (but does not have to be) similar to the temporal probability collision map 900 described above with reference to FIG. 9.

In step 1410, the control device obtains at least one geometric collision map identifying, for a particular UWB anchor, other UWB anchors that have detected at least one mobile device-to-anchor exchange involving the particular UWB anchor. For example, the geometric collision map can be (but does not have to be) similar to the geometric collision map 1000 described above with reference to FIG. 10.

In step 1415, the control device computes a relative collision tolerance mapping by cross-correlating the temporal probability collision map and the geometric collision map. The control device also may use signal strength, complexity, and/or other information, which may or may not be included in the temporal probability collision map and/or geometric collision map, to compute the relative collision tolerance mapping. The relative collision tolerance mapping includes, for each particular one of a plurality of UWB anchors (e.g., the plurality of UWB anchors for which the mobile device has had a signal strength above the predetermined threshold during the predetermined period of time), an indication, for a given count of mobile devices ranging against the particular one of the UWB anchors, a probability that a mobile device ranging against another of the plurality of UWB anchors would cause a destructive collision with the particular one of the UWB anchors.

In step 1420, the control device selects one of the plurality of UWB anchors as the new primary UWB anchor for the mobile device based on the relative collision tolerance mapping and a signal strength for the mobile device. For example, the control device can maximize {tolerance, mobile device signal} and select a primary UWB anchor with a highest relative tolerance and mobile device signal. Processing continues to step 1325 in FIG. 13.

As would be recognized by a person of skill in the art, the steps associated with the methods of the present disclosure, including method 1300 and the operations of step 1320, may vary widely. Steps may be added, removed, altered, combined, and reordered without departing from the spirit or the scope of the present disclosure. Therefore, the example methods are to be considered illustrative and not restrictive, and the examples are not to be limited to the details given herein but may be modified within the scope of the appended claims.

Figure 15:
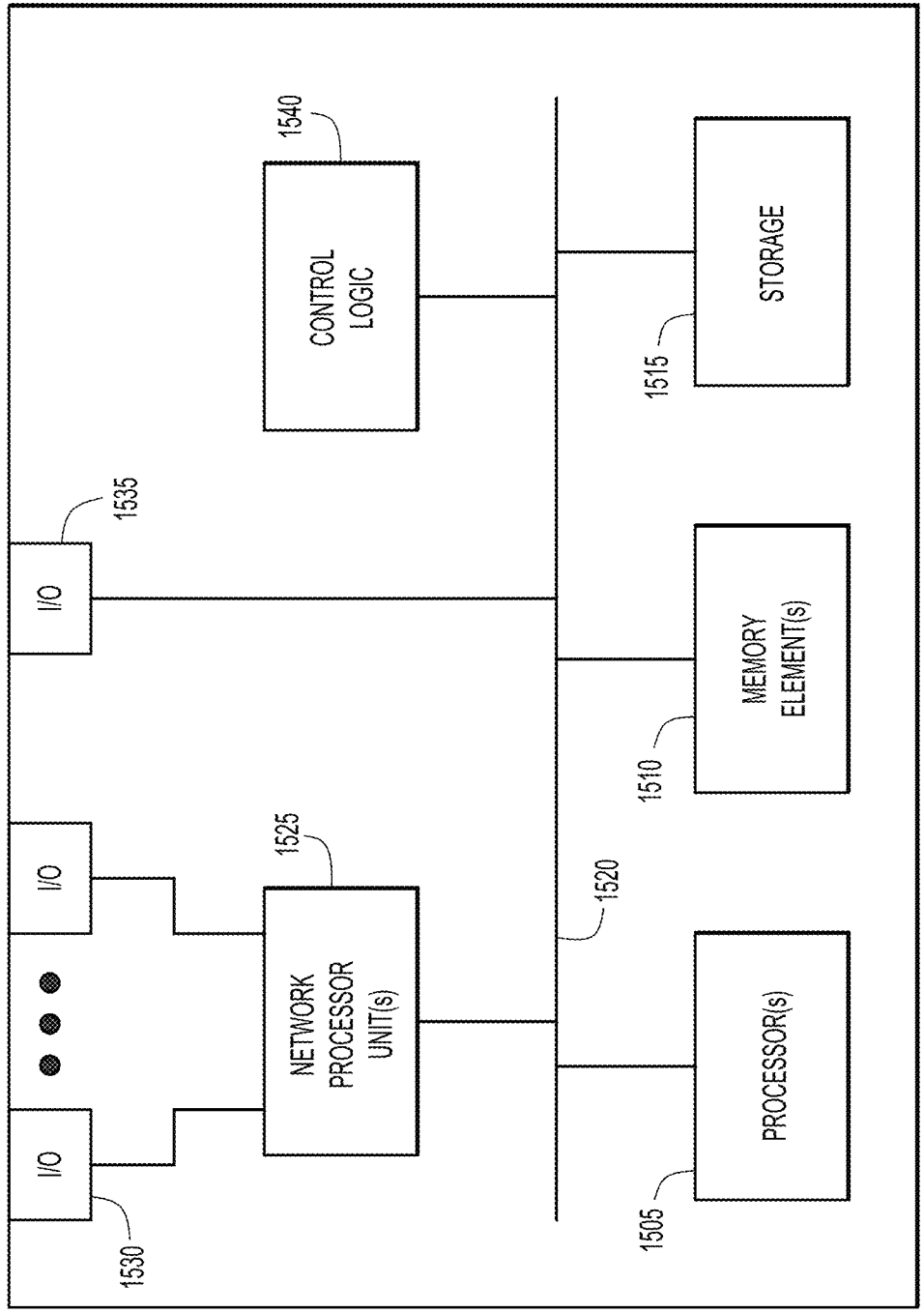
FIG. 15 is a block diagram of a computing device configured to perform functions associated with the techniques described herein, according to an example embodiment.

Referring to FIG. 15, FIG. 15 illustrates a hardware block diagram of a computing device 1500 that may perform functions associated with operations discussed herein in connection with the techniques depicted in FIGS. 1-14. In various embodiments, a computing device, such as computing device 1500 or any combination of computing devices 1500, may be configured as any entity/entities as discussed for the techniques depicted in connection with FIGS. 15, such as the control device 180, controller 185, area engine 195, or location engine 190 shown in FIG. 1 or the control device 580 FIGS. 5A, 5B, and 10, in order to perform operations of the various techniques discussed herein.

In at least one embodiment, the computing device 1500 may include one or more processor(s) 1505, one or more memory element(s) 1510, storage 1515, a bus 1520, one or more network processor unit(s) 1525 interconnected with one or more network input/output (I/O) interface(s) 1530, one or more I/O interface(s) 1535, and control logic 1540. In various embodiments, instructions associated with logic for computing device 1500 can overlap in any manner and are not limited to the specific allocation of instructions and/or operations described herein.

In at least one embodiment, processor(s) 1505 is/are at least one hardware processor configured to execute various tasks, operations and/or functions for computing device 1500 as described herein according to software and/or instructions configured for computing device 1500. Processor(s) 1505 (e.g., a hardware processor) can execute any type of instructions associated with data to achieve the operations detailed herein. In one example, processor(s) 1505 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1510 and/or storage 1515 is/are configured to store data, information, software, and/or instructions associated with computing device 1500, and/or logic configured for memory element(s) 1510 and/or storage 1515. For example, any logic described herein (e.g., control logic 1540) can, in various embodiments, be stored for computing device 1500 using any combination of memory element(s) 1510 and/or storage 1515. Note that in some embodiments, storage 1515 can be consolidated with memory element(s) 1510 (or vice versa), or can overlap/exist in any other suitable manner.

In at least one embodiment, bus 1520 can be configured as an interface that enables one or more elements of computing device 1500 to communicate in order to exchange information and/or data. Bus 1520 can be implemented with any architecture designed for passing control, data and/or information between processors, memory elements/storage, peripheral devices, and/or any other hardware and/or software components that may be configured for computing device 1500. In at least one embodiment, bus 1520 may be implemented as a fast kernel-hosted interconnect, potentially using shared memory between processes (e.g., logic), which can enable efficient communication paths between the processes.

In various embodiments, network processor unit(s) 1525 may enable communication between computing device 1500 and other systems, entities, etc., via network I/O interface(s) 1530 to facilitate operations discussed for various embodiments described herein. In various embodiments, network processor unit(s) 1525 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1500 and other systems, entities, etc. to facilitate operations for various embodiments described herein. In various embodiments, network I/O interface(s) 1530 can be configured as one or more Ethernet port(s), Fibre Channel ports, and/or any other I/O port(s) now known or hereafter developed. Thus, the network processor unit(s) 1525 and/or network I/O interface(s) 1530 may include suitable interfaces for receiving, transmitting, and/or otherwise communicating data and/or information in a network environment.

I/O interface(s) 1535 allow for input and output of data and/or information with other entities that may be connected to computer device 1500. For example, I/O interface(s) 1535 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1540 can include instructions that, when executed, cause processor(s) 1505 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1540) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), ASIC, etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1510 and/or storage 1515 can store data, software, code, instructions (e.g., processor instructions), logic, parameters, combinations thereof, and/or the like used for operations described herein. This includes memory element(s) 1510 and/or storage 1515 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, in one form, a computer-implemented method can include monitoring, by a control device, ultra-wide band (UWB) ranging between a mobile device and a primary UWB anchor. The control device can determine that a signal strength between the mobile device and the primary UWB anchor is below a predetermined threshold. For example, the determining can indicate that the mobile device is moving away from the primary UWB anchor in a venue where the primary UWB anchor is located.

In response to the determining, the control device can identify a plurality of UWB anchors for which the mobile device has had a signal strength above the predetermined threshold during a predetermined period of time, the plurality of UWB anchors not including the primary UWB anchor; and select one of the plurality of UWB anchors as a new primary UWB anchor for the mobile device based on a relative collision tolerance mapping for the new primary UWB anchor and at least one other UWB anchor within a UWB range of the new primary UWB anchor. The control device can send a command that causes a UWB ranging procedure to be performed between the mobile device and the new primary UWB anchor.

For example, selecting the one of the plurality of UWB anchors as the new primary UWB anchor for the mobile device can include determining, for each of the plurality of UWB anchors, a relative collision tolerance and a signal strength for the mobile device; and selecting the one of the plurality of UWB anchors as the new primary UWB anchor for the mobile device based on the relative collision tolerance and the signal strength. The relative collision tolerance mapping can be computed to include, for example, for each particular one of the plurality of UWB anchors, an indication, for a given count of mobile devices ranging against the particular one of the plurality of UWB anchors, a probability that a mobile device ranging against another of the plurality of UWB anchors would cause a destructive collision with the particular one of the plurality of UWB anchors.

Computing the relative collision tolerance mapping can include, e.g., cross-correlating a temporal probability collision map and a geometric collision map. The temporal probability collision map can indicate, for a particular UWB anchor, a collision probability if a mobile device count of mobile devices ranging against the particular UWB anchor increases. The collision probability can be determined, e.g., based on a collision count and the mobile device count during a particular time interval. Computing can further include using a signal level when a collision occurs to determine whether a particular collision is considered a destructive collision. The geometric collision map can identify, for a particular UWB anchor, other UWB anchors that have each detected at least one mobile device-to-anchor exchange involving the particular UWB anchor. Computing the relative collision tolerance mapping can be performed repeatedly, at predetermined time intervals.

In another form, an apparatus can include an interface configured to enable network communications, and one or more processors coupled to the interface. The one or more processors can be configured to perform operations including, e.g.: monitoring ultra-wide band (UWB) ranging between a mobile device and a primary UWB anchor; determining that a signal strength between the mobile device and the primary UWB anchor is below a predetermined threshold; in response to the determining: identifying a plurality of UWB anchors for which the mobile device has had a signal strength above the predetermined threshold during a predetermined period of time, the plurality of UWB anchors not including the primary UWB anchor; and selecting one of the plurality of UWB anchors as a new primary UWB anchor for the mobile device based on a relative collision tolerance mapping for the new primary UWB anchor and at least one other UWB anchor within a UWB range of the new primary UWB anchor; and sending a command that causes a UWB ranging procedure to be performed between the mobile device and the new primary UWB anchor.

In another form, one or more non-transitory computer readable storage media can include instructions that, when executed by at least one processor, are operable to: monitor ultra-wide band (UWB) ranging between a mobile device and a primary UWB anchor; determine that a signal strength between the mobile device and the primary UWB anchor is below a predetermined threshold; in response to the determining: identify a plurality of UWB anchors for which the mobile device has had a signal strength above the predetermined threshold during a predetermined period of time, the plurality of UWB anchors not including the primary UWB anchor; and select one of the plurality of UWB anchors as a new primary UWB anchor for the mobile device based on a relative collision tolerance mapping for the new primary UWB anchor and at least one other UWB anchor within a UWB range of the new primary UWB anchor; and send a command that causes a UWB ranging procedure to be performed between the mobile device and the new primary UWB anchor.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
identifying a plurality of ultra-wide band (UWB) anchors for which a mobile device has had a signal strength above a predetermined threshold during a predetermined period of time, the plurality of UWB anchors not including a primary UWB anchor with which the mobile device has previously performed UWB ranging;
selecting one of the plurality of UWB anchors as a new primary UWB anchor for the mobile device based on a relative collision tolerance mapping for the new primary UWB anchor and at least one other UWB anchor within a UWB range of the new primary UWB anchor; and
sending a command that causes a UWB ranging procedure to be performed between the mobile device and the new primary UWB anchor.

2. The computer-implemented method of claim 1, wherein the identifying, selecting, and sending are performed based on determining that a signal strength between the mobile device and the primary UWB anchor is below the predetermined threshold.

3. The computer-implemented method of claim 1, wherein selecting comprises:
   determining, for each of the plurality of UWB anchors, a relative collision tolerance and a signal strength for the mobile device; and
   selecting the one of the plurality of UWB anchors as the new primary UWB anchor for the mobile device based on the relative collision tolerance and the signal strength.

4. The computer-implemented method of claim 1, further comprising computing the relative collision tolerance mapping to include, for a particular one of the plurality of UWB anchors, an indication, for a given count of mobile devices ranging against the particular one of the plurality of UWB anchors, a probability that a mobile device ranging against another of the plurality of UWB anchors would cause a destructive collision with the particular one of the plurality of UWB anchors.

5. The computer-implemented method of claim 4, wherein computing is performed repeatedly, at predetermined time intervals.

6. The computer-implemented method of claim 4, wherein computing comprises cross-correlating a temporal probability collision map and a geometric collision map.

7. The computer-implemented method of claim 6, wherein computing further comprises using a signal level when a collision occurs to determine whether a particular collision is considered a destructive collision.

8. The computer-implemented method of claim 6, wherein the geometric collision map identifies, for a particular UWB anchor, other UWB anchors that have each detected at least one mobile device-to-anchor exchange involving the particular UWB anchor.

9. The computer-implemented method of claim 6, wherein the temporal probability collision map indicates, for a particular UWB anchor, a collision probability if a mobile device count of mobile devices ranging against the particular UWB anchor increases.

10. The computer-implemented method of claim 9, further comprising determining the collision probability based on a collision count and the mobile device count during a particular time interval.

11. The computer-implemented method of claim 1, wherein determining indicates that the mobile device is moving away from the primary UWB anchor in a venue where the primary UWB anchor is located.

12. An apparatus comprising:
   an interface configured to enable network communications; and
   one or more processors coupled to the interface and configured to perform operations including:
      identifying a plurality of ultra-wide (UWB) anchors for which a mobile device has had a signal strength above a predetermined threshold during a predetermined period of time, the plurality of UWB anchors not including a primary UWB anchor with which the mobile device has previously performed UWB ranging;
      selecting one of the plurality of UWB anchors as a new primary UWB anchor for the mobile device based on a relative collision tolerance mapping for the new primary UWB anchor and at least one other UWB anchor within a UWB range of the new primary UWB anchor; and
      sending a command that causes a UWB ranging procedure to be performed between the mobile device and the new primary UWB anchor.

13. The apparatus of claim 12, wherein the identifying, selecting, and sending are performed based on determining that a signal strength between the mobile device and the primary UWB anchor is below the predetermined threshold.

14. The apparatus of claim 12, wherein the one or more processors are further configured to select the one of the plurality of UWB anchors as the new primary UWB anchor for the mobile device by:
   determining, for each of the plurality of UWB anchors, a relative collision tolerance and a signal strength for the mobile device; and
   selecting the one of the plurality of UWB anchors as the new primary UWB anchor for the mobile device based on the relative collision tolerance and the signal strength.

15. The apparatus of claim 12, wherein the one or more processors are further configured to compute the relative collision tolerance mapping to include, for a particular one of the plurality of UWB anchors, an indication, for a given count of mobile devices ranging against the particular one of the plurality of UWB anchors, a probability that a mobile device ranging against another of the plurality of UWB anchors would cause a destructive collision with the particular one of the plurality of UWB anchors.

16. One or more non-transitory computer readable storage media comprising instructions that, when executed by at least one processor, are operable to:
   identifying a plurality of ultra-wide (UWB) anchors for which a mobile device has had a signal strength above a predetermined threshold during a predetermined period of time, the plurality of UWB anchors not including a primary UWB anchor with which the mobile device has previously performed UWB ranging;
   selecting one of the plurality of UWB anchors as a new primary UWB anchor for the mobile device based on a relative collision tolerance mapping for the new primary UWB anchor and at least one other UWB anchor within a UWB range of the new primary UWB anchor; and
   sending a command that causes a UWB ranging procedure to be performed between the mobile device and the new primary UWB anchor.

17. The one or more non-transitory computer readable storage media of claim 16, wherein the identifying, selecting, and sending are performed based on determining that a signal strength between the mobile device and the primary UWB anchor is below the predetermined threshold.

18. The one or more non-transitory computer readable storage media of claim 16, wherein the instructions further cause the processor to select the one of the plurality of UWB anchors as the new primary UWB anchor for the mobile device by:
   determining, for each of the plurality of UWB anchors, a relative collision tolerance and a signal strength for the mobile device; and
   selecting the one of the plurality of UWB anchors as the new primary UWB anchor for the mobile device based on the relative collision tolerance and the signal strength.

19. The one or more non-transitory computer readable storage media of claim 16, wherein the instructions further cause the processor to compute the relative collision tolerance mapping to include, for a particular one of the plurality of UWB anchors, an indication, for a given count of mobile devices ranging against the particular one of the plurality of UWB anchors, a probability that a mobile device ranging against another of the plurality of UWB anchors would cause a destructive collision with the particular one of the plurality of UWB anchors.

20. The one or more non-transitory computer readable storage media of claim 16, wherein the instructions further cause the processor to compute the relative collision tolerance mapping by cross-correlating a temporal probability collision map and a geometric collision map, the temporal probability collision map indicating, for a particular UWB anchor, a collision probability if a mobile device count of mobile devices ranging against the particular UWB anchor increases, the geometric collision map identifying, for a particular UWB anchor, other UWB anchors that have each detected at least one mobile device-to-anchor exchange involving the particular UWB anchor.

* * * * *

UNITED STATES PATENT AND TRADEMARK OFFICE
CERTIFICATE OF CORRECTION

PATENT NO. : 11,812,334 B2
APPLICATION NO. : 17/885981
DATED : November 7, 2023
INVENTOR(S) : Jerome Henry et al.

It is certified that error appears in the above-identified patent and that said Letters Patent is hereby corrected as shown below:

In the Claims

Claim 12, Column 27, Line 52, please replace "ultra-wide (UWB) anchors" with --ultra-wide band (UWB) anchors--

Claim 16, Column 28, Line 29, please replace "ultra-wide (UWB) anchors" with --ultra-wide band (UWB) anchors--

Signed and Sealed this
Fifth Day of March, 2024

Katherine Kelly Vidal
*Director of the United States Patent and Trademark Office*